US012434737B2

(12) United States Patent
Pronovost

(10) Patent No.: US 12,434,737 B2
(45) Date of Patent: Oct. 7, 2025

(54) TRAJECTORY PREDICTION FOR AUTONOMOUS VEHICLES USING ATTENTION MECHANISM

(71) Applicant: Zoox, Inc., Foster City, CA (US)

(72) Inventor: Ethan Miller Pronovost, Redwood City, CA (US)

(73) Assignee: Zoox, Inc., Foster City, CA (US)

( * ) Notice: Subject to any disclaimer, the term of this patent is extended or adjusted under 35 U.S.C. 154(b) by 184 days.

(21) Appl. No.: 18/093,256

(22) Filed: Jan. 4, 2023

(65) Prior Publication Data

US 2024/0217548 A1 Jul. 4, 2024

(51) Int. Cl.
*B60W 60/00* (2020.01)
*B60W 50/00* (2006.01)
*G06N 20/00* (2019.01)

(52) U.S. Cl.
CPC .... *B60W 60/0011* (2020.02); *B60W 50/0097* (2013.01); *B60W 60/00274* (2020.02);
(Continued)

(58) Field of Classification Search
CPC ......... B60W 60/0011; B60W 50/0097; B60W 60/00274; B60W 2554/20;
(Continued)

(56) References Cited

U.S. PATENT DOCUMENTS 11,427,195 B1 * 8/2022 Pertsel .................. B60W 30/09
11,858,536 B1 * 1/2024 Liu ....................... G06N 3/0464
(Continued)

FOREIGN PATENT DOCUMENTS

CN 114450724 A * 5/2022 ............ G06F 18/23
CN 114913197 A 8/2022
(Continued)

OTHER PUBLICATIONS

Bassoy,CemSavas."Iterator-Based DesignofGenericC++Algorithms forBasicTensorOperations." Frontiersinapplied mathematicsandstatistics8(2022):n.pag.Web. (Year: 2022).*
(Continued)

*Primary Examiner* — Ramya P Burgess
*Assistant Examiner* — Keith A von Volkenburg
(74) *Attorney, Agent, or Firm* — Lee & Hayes, P.C.

(57) ABSTRACT

Techniques are discussed herein for using a machine learning attention mechanism to predict movements, states, and/or trajectories of agents in various environments. In various examples, a prediction component of an autonomous vehicle may analyze sensor data to determine, for individual agents in the environment, unique sets of additional objects that are relevant to predicting the subsequent movements of the individual agents. For a particular agent, the prediction component may determine the relative positions and/or states between the agent and the associated set of relevant objects for the agent, and may use an attention mechanism to determine an object interaction vector including weighted attention scores for each additional object relative to the agent. Object interaction vectors may be generated for any number of agents and/or any number of timesteps to determine predicted agent movements and to forecast subsequent driving scenes within the environment.

20 Claims, 10 Drawing Sheets

(52) U.S. Cl.
CPC ......... *G06N 20/00* (2019.01); *B60W 2554/20* (2020.02); *B60W 2554/4041* (2020.02); *B60W 2554/4045* (2020.02)

(58) Field of Classification Search
CPC .. B60W 2554/4041; B60W 2554/4045; G06N 20/00
USPC .......................................................... 701/23
See application file for complete search history.

(56) References Cited

U.S. PATENT DOCUMENTS

| | | | |
|---|---|---|---|
| 2020/0324794 A1* | 10/2020 | Ma .................. | B60W 60/00272 |
| 2021/0056402 A1 | 2/2021 | McGill et al. | |
| 2021/0150228 A1 | 5/2021 | Goforth et al. | |
| 2021/0261167 A1* | 8/2021 | Kum ...................... | G06N 3/049 |
| 2021/0402991 A1 | 12/2021 | Gautam et al. | |
| 2022/0048503 A1* | 2/2022 | Khandelwal ...... | B60W 30/0956 |
| 2022/0156939 A1* | 5/2022 | Homayounfar ...... | G06V 10/945 |
| 2022/0212660 A1* | 7/2022 | Freeman .................. | G01S 7/417 |
| 2022/0274625 A1* | 9/2022 | Garimella ................ | G06N 3/04 |
| 2022/0355825 A1* | 11/2022 | Deo .................. | B60W 50/0097 |
| 2022/0379917 A1* | 12/2022 | Henke ............... | B60W 60/0027 |
| 2022/0405506 A1* | 12/2022 | Taamazyan .......... | B25J 15/0608 |

FOREIGN PATENT DOCUMENTS

| | | | | |
|---|---|---|---|---|
| EP | 4224436 A1 | * | 8/2023 | ............. G06V 20/52 |
| JP | 6712088 B2 | * | 6/2020 | ........... G06V 10/764 |
| WO | WO2022103737 A1 | | 5/2022 | |

OTHER PUBLICATIONS

PCT Search Report and Written Opinion Dated May 1, 2024, for PCT Application No. PCT/US2024/010138, 11 pages.

* cited by examiner

TRAJECTORY PREDICTION FOR AUTONOMOUS VEHICLES USING ATTENTION MECHANISM

BACKGROUND

Autonomous driving may benefit from computing systems capable of determining driving paths and navigating along routes from an initial location toward a destination. For example, autonomous and semi-autonomous vehicles may utilize systems and components to traverse through driving environments including other objects, such as moving or stationary vehicles (autonomous or otherwise), pedestrians, buildings, etc. When traversing through such an environment, the vehicle may determine a trajectory based on sensor data from the perception systems of the vehicle, as well as map data of the environment. For example, a planning system within an autonomous or semi-autonomous vehicle may determine a trajectory and a corresponding set of actions for the vehicle to take to navigate in an operating environment. Trajectory selection techniques may take into account considerations such as kinematic and/or dynamic (kino-dynamic) feasibility of the vehicle, passenger safety and comfort, driving efficiency, route continuity, and the like. Additionally, the trajectory and actions for a vehicle may be determined based in part on avoiding other objects present in the environment. For example, an action may be generated by a planning system to yield to a pedestrian, to change a lane to avoid another vehicle in the road, etc. The perception systems of the vehicle may utilize sensor data to perceive the environment, which enables the planning system to determine the effect of detected objects on the potential actions that the vehicle may perform. However, complex environments may preclude efficient determinations of trajectories for the vehicle, especially when such environments include large number of additional agents and/or static objects to be accounted for by the vehicle when determining a trajectory.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
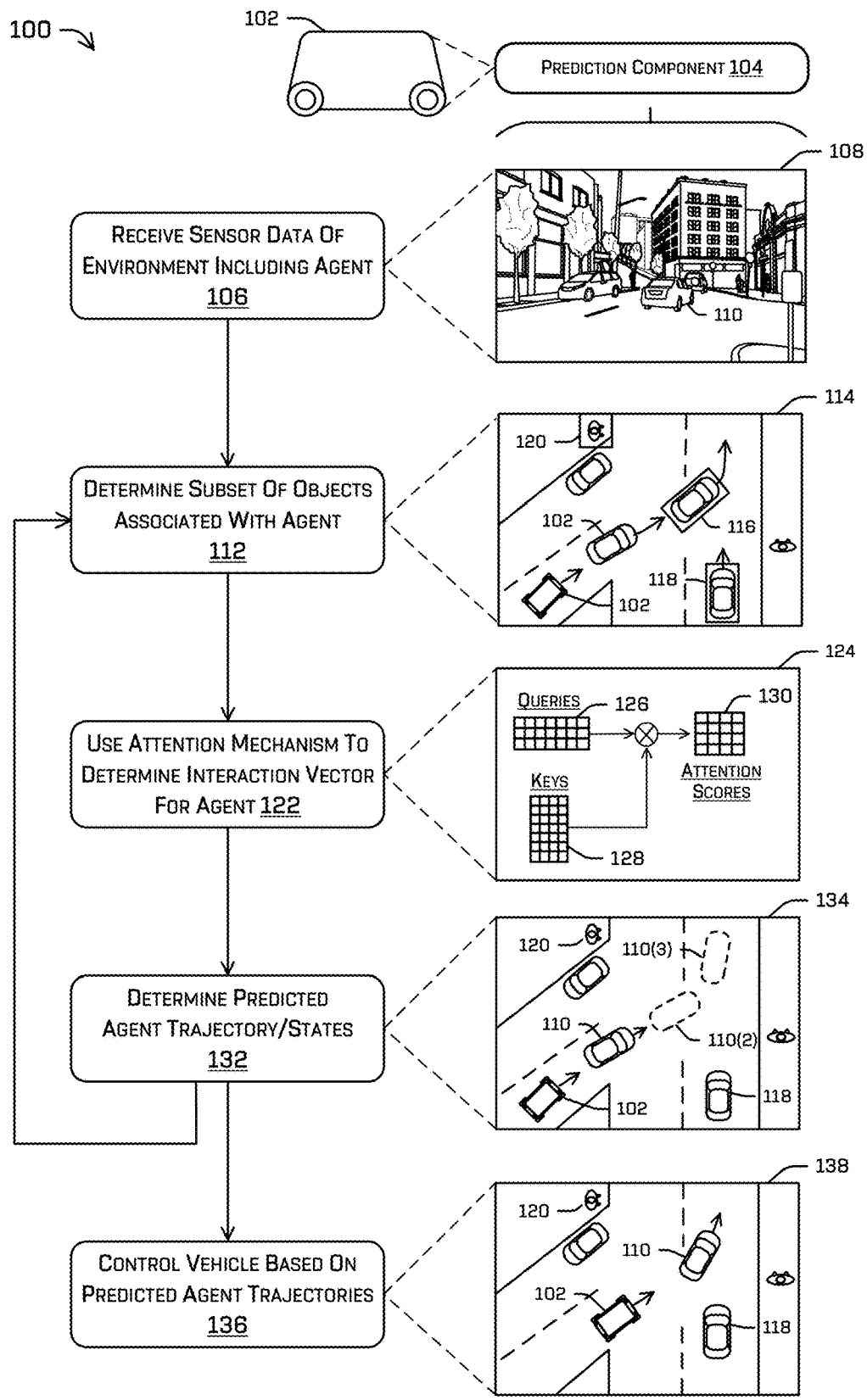
FIG. 1 illustrates an example technique of determining a predicted trajectory of an agent in an environment using a machine learning (ML) attention mechanism, in accordance with one or more examples of the disclosure.

This application relates to using machine learning (ML) attention mechanisms to predict movements of agents and interactions between agents in an environment. In various examples, a prediction component associated with a vehicle in a driving environment may receive and analyze sensor data representing any number of additional static objects and/or dynamic objects (or agents) in the environment. Based on the sensor data, the prediction component may determine, for an agent in the environment, a set of additional objects that are relevant to predicting the future movements and/or behaviors of the agent. After determining the set of relevant objects associated with an agent, the prediction component may determine the relative positions and/or relative states between the agent and each of the relevant objects. The prediction component then may use an attention mechanism to determine an object interaction vector for the agent, including attention scores for the agent associated with each of the additional objects. Similar techniques may be used to determine object interaction vectors for any number of agents in the environment, and the object interaction vectors can be used by the prediction component to jointly predict the future movements and/or states of the agents in the environment, including forecasting various interactions between the agents and/or determining the predicted future states of the agents and the environment as a whole.

In various examples, the techniques discussed herein may be implemented in the context of a vehicle, such as an autonomous vehicle. When an autonomous vehicle is operating in an environment, the vehicle may use sensors to capture sensor data (e.g., image or video data, radar data, lidar data, sonar data, etc.) of the surrounding environment, and may analyze the sensor data to detect and classify objects within the environment. As described herein, an agent may refer to a dynamic object that is capable of movement, such as a vehicle, motorcycle, bicycle, pedestrian, animal, etc.). Objects encountered by the autonomous vehicle within the environment may include other agents and/or static objects such as buildings, road surfaces, trees, signs, barriers, parked vehicles, etc. In order to safely traverse the environment, the autonomous vehicle may include components configured to analyze the attributes of the detected objects and predict trajectories for the agents. For example, perception and/or prediction components of an autonomous vehicle may execute trained models or other subcomponents configured to detect and classify objects based on the sensor data (e.g., segmentation, classification, tracking, etc.), and to analyze the movement of objects to predict future routes and/or trajectories, etc. Perception and/or prediction components may analyze various modalities of the sensor data to classify objects into object types (e.g., cars, trucks, motorcycles, pedestrians, cyclists, animals, buildings, trees, etc.), may determine object features or attributes, and may predict future object behaviors and states (e.g., potential trajectories, locations, poses, etc.) based on the output of the trained prediction models.

To traverse an environment safely and efficiently, it may be important for an autonomous vehicle to make accurate predictions of the future locations and states of the other objects in the environment. However, predicting the trajectories of agents in real-world driving environments can be technically challenging and computationally expensive. For example, an autonomous vehicle may predict a future trajectory for an agent based on a current or previous trajectory of the agent, the existing velocity vector of the agent, and/or the map data associated with the environment. However, agents may change their trajectories frequently and unpredictably, requiring the autonomous vehicle to update the predicted agent trajectories and determine corresponding updated driving maneuvers on the fly for the autonomous vehicle to perform.

A number of prediction systems may use ML models and related techniques to predict the future locations of agents and/or other objects in environments. For example, existing prediction models have been implemented using neural networks including multilayer perceptrons (MLPs), convolutional neural networks (CNNs), recurrent neural networks (RNNs), graph neural networks (GNNs) and the like. Autonomous vehicles may use the ML prediction models to make future state predictions (e.g., predicted locations, predicted trajectories, poses, and/or other state data) for the agents in the environment. In some cases, a prediction component of an autonomous vehicle may execute one or more ML prediction models configured to output predicted state data based on a current representation of the environment, including the map data at the current location, the current states of the proximate agents and other objects in the environment, and the current state and planned route of the autonomous vehicle traversing the environment. Various ML prediction models may be trained using training data, which may include log data previously captured by similar vehicles traversing similar environments.

In certain ML-based prediction systems, GNNs or other data structures may be used to store object data (e.g., object features) representing the objects in the environment, as well as edge data (e.g., edge features) representing the relative state offsets between pairs of objects (e.g., relative positions, relative sizes, relative poses, relative velocities, etc.). When such systems are fully connected, the amount of edge data that the ML model is required to store and process may scale quadratically based on the number of the objects in the environment. As a result, these systems can be highly data-intensive and compute-intensive, causing latency spikes when operating in crowded environments involving large numbers of objects.

To address the challenges of predicting future object movements and states in crowded and complex environments, the techniques described herein may use a scalable, fixed-cost ML attention mechanism rather than a GNN or other fully-connected network. In particular, in various examples described herein, a prediction component may perform a two-step process for predicting the movement of an agent based on the additional objects/agents in the environment. Initially, the prediction component may determine a fixed-sized set of additional objects within the environment that may be relevant to predicting the future movement of the agent. The prediction component may determine the set of relevant objects for an agent using various techniques, including heuristics and/or ML models, and the set of relevant objects associated with an agent can change at different timesteps within a trajectory prediction for the agent.

After determining the set of relevant objects for an agent at a particular time, the prediction component may execute an ML attention mechanism to determine an object interaction vector for the agent at that time. The object interaction vector may include (or may be based on) a set of weighted attention scores indicating how relevant each of the other objects are to the agent for determining its next action in the environment. When executing the attention mechanism, the prediction component may determine a set of attention queries based on agent feature vectors, and a corresponding set of attention keys based on the relative state differences (e.g., position differences, orientation differences, velocity differences, object type differences, etc.) between the set of relevant objects. The prediction component may use the attention queries and keys to compute a set of attention scores for each agent in the environment. For each agent, the set of attention scores may include a separate attention score associated with each of the other objects that were determined as being relevant to the agent at that time. Each attention score for an agent-object pair may represent a prediction of how relevant the object is to the agent in determining its next movement (or other behavior) in the environment. As described below, the prediction component may generate sets of attention scores for any number of agents in the environment, where each set of attention scores for an agent is associated with the unique set of objects that are relevant to that agent. Further, the prediction component may regenerate the attention scores for each agent (using the same set of relevant objects or different sets of objects) at different timesteps when predicting a trajectory for the agent over a period of time.

The prediction component may use the sets of attention scores determined for the agents in various ways to predict the movements of the agents in the environment. In some examples, the prediction component may use the attention scores to generate a set of interaction feature vectors associated with the agents. For instance, for each agent, the prediction component may multiply the set of attention scores associated with the agent by a set of object feature vectors for each of the other relevant objects. The prediction component then may aggregate the results to determine, for each agent, a set of interaction feature vectors representing the other objects weighted by their respective attention scores.

To predict the future movements of the agents in the environment, individually or jointly with other agents, the prediction component may use a combination of object feature vectors (e.g., representing agents/static objects) and interaction feature vectors (e.g., representing edge features with relative state data object pairs). For example, the prediction component may determine a predicted position (or other predicted state data) for an agent by updating the attention mechanism and/or performing an inference operation on the attention mechanism. Similar updates and/or inference operations to the attention mechanism may be performed to determine the predicted positions/states for the other agents in the environment, and these techniques may be performed recurrently to determine predicted trajectories for the agents over a period of time in the environment. In various examples, the prediction component may use the attention mechanism to determine predicted agent trajectories individually, and/or may perform joint trajectory prediction techniques to determine compatible trajectories using the attention mechanism (e.g., taking into account agent-to-agent interactions) to determine predicted future state(s) for the environment as a whole.

In various examples, a predicted movement of an agent in the environment (e.g., from one timestep to the next) may be determined using the attention mechanism in various ways. For instance, a predicted movement and/or predicted future position of an agent may be determined by sampling from an object feature vector distribution output by the attention mechanism. Additional features and examples for sampling predicted positions of objects from distribution data can be found, for examples, in U.S. patent application Ser. No. 17/535,357, filed Nov. 24, 2021, and entitled, "Encoding Relative Object Information Into Node Edge Features," the entire contents of which is incorporated herein by reference for all purposes.

After using the attention mechanism to determine predicted future state data (e.g., predicted movements, positions, poses, velocities, etc.) for one or more agents in the environment at a first timestep (e.g., Time=$t_1$), the prediction component may use similar techniques with the attention mechanism to determine additional predicted future state data for the agents at a next timestep (e.g., Time=$t_2$) based on the predicted agent states for Time $t_1$, and so on. These techniques (e.g., inference and/or update of the attention mechanism) may be recurrently performed any number of times to determine the sequences of predicted future states (e.g., positions, movements, poses, velocities, etc.) for the agents. This process may be repeated any number of times to determine sets of predicted future positions and/or movement of the agents at incremental timesteps (e.g., 0.1 seconds, 0.5 second, 1 second, 2 seconds, etc.) out to any time in the future (e.g., 1 second, 2 seconds, 4 seconds, 8 seconds, etc.).

The prediction component may use sequences of predicted positions and/or movements determined by the attention mechanism for an agent to determine a predicted trajectory that the agent may follow in the environment. For example, a predicted trajectory for an agent may be determined based on a starting (or current) state of the agent (e.g., position, pose, velocity, yaw, and/or steering angle, etc.) at Time=$t_0$, the next predicted state of the agent (e.g., at Time=$t_1$), the next predicted state of the agent (e.g., (at Time=$t_2$), and so on. The predicted trajectory may be configured to follow along the predicted positions for the object as the timesteps increment.

Additionally, while some examples are herein described in reference to a single agent in the environment, the techniques described herein may be performed in parallel (e.g., on a parallel processing device such as a graphics processing unit (GPU)), such that predicted agent states and/or trajectories may be output for any number of agents in the environment at a single timestep, including predicted positions of the agents at the next timestep relative to the other predicted positions of the other agents and static objects in the environment. This allows for N sets of futures to be determined for an environment over a period of time, where N may be any integer greater than 0 and each future may include a single set of compatible predicted trajectories for the agents (e.g., determined using joint trajectory prediction that does not result in a collision or other interaction) in the environment.

The techniques described herein thus address the technical challenges of predicting future object trajectories and/or states in complex environments, and provide a number of technical improvements for trajectory prediction systems. For example, in contrast to systems using fully-connected networks and/or other systems that include hidden states per edge, the attention techniques described herein include a fixed maximum number of relevant objects per agent. As a result, the attention mechanism can be structured more easily and efficiently, including creating tensors to store relative state information between agents and object, and using standard deep learning cross attention on the tensors to process and aggregate the relative state information. The attention mechanisms described herein also provide significant reductions in the data storage and compute requirements in contrast to fully-connected models requiring quadratic scaling, thereby reducing the potential for latency spikes when predicting agent trajectories in crowded environments. Using heuristics and/or ML models, each possible agent-object pair may be evaluated, but in a manner far more efficient in data storage and computation than using hidden states per edge in a network.

The techniques herein also provide improved flexibility when predicting agent trajectories over periods of time. As described herein, a trajectory may refer to a sequence of states for an agent (e.g., a sequence of predicted positions, poses, actions, etc.) and/or a predicted path of motion for an agent over a period of time. For an agent in the driving environment, the prediction component may determine a unique fixed-size subset of relevant objects on which to execute the attention mechanism for the agent. As described herein, because the attention mechanism may use stateless interactions (e.g., without an RNN for agent-object pairs), the subset of objects that are relevant to an agent may change at different timesteps as the predicted trajectory is determined. For example, a first agent (e.g., a vehicle) may attend to a nearby parked car at one timestep in the trajectory prediction, but may no longer attend to the parked car at a subsequent timestep. The ability to change the subsets of relevant objects for an agent during the trajectory prediction can both simplify and improve the accuracy of the relative object determinations (e.g., by using a heuristic that evaluates relevance at the current time only and need not consider future relevance).

Further, these techniques provide additional advantages of using cross-attention in some cases, and thus support examples in which the set of objects being attended to can be different from the set of attending agents. As an example, to perform more efficient and accurate predictions, the prediction component may determine that active ML-based trajectory prediction should be performed for moving agents (e.g., vehicles, bicycles, and/or pedestrians) but not for non-moving agents (e.g., parked vehicles) and other static objects (e.g., traffic cones, road debris, etc.). As described herein, the attention mechanism may support different dimensionality between (attending) agents and (attended to) objects. Thus, these techniques may save latency by performing trajectory predictions only for the moving agents, while allowing those agents to attend to non-moving agents and static objects, etc.

Based on the technical advantages and improvements discussed herein, these techniques provide improved and more cost-efficient agent trajectory predictions. For example, a vehicle using these techniques to perform predictions of future states and/or trajectories for any number of agents in an environment may determine driving maneuvers for the vehicle to perform more quickly and with greater accuracy, thus improving safety outcomes and driving efficiency. These and other improvements are discussed herein.

The techniques described herein can be implemented in a number of ways. Example implementations are provided below with reference to the following figures. Although discussed in the context of an autonomous vehicle, the methods, apparatuses, and systems described herein can be applied to a variety of systems (e.g., a sensor system or a robotic platform), and are not limited to autonomous vehicles. In examples, the techniques described herein may be utilized in driver-controlled vehicles in which such a system may provide an indication to a driver of the vehicle of whether it is safe to perform various maneuvers. The techniques can be utilized in an aviation or nautical context, or in any system involving objects or entities that may be associated with behavior that is unknown to the system.

FIG. 1 depicts an example process 100 of determining predicted future states and/or trajectories of one or more agents in an environment using a machine learning (ML) attention mechanism. In various implementations, some or all of the operations in process 100 may be performed by a prediction component 104 within a vehicle 102 (e.g., an autonomous vehicle. However, in other examples, the various operations of process 100 are not limited to vehicles may be performed by prediction components within other systems (e.g., security systems, traffic monitoring systems, aviation or nautical systems, etc.).

At operation 106, the prediction component 104 may receive sensor data of an environment including one or more agents. The sensor data received in operation 106 may include, but is not limited to, lidar data, radar data, sonar data, time-of-flight data, and/or other depth data, as well as image and/or video data. In some examples, the sensor data may include sensor data captured by sensors of the vehicle 102. For example, the vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 102 may be a fully or partially autonomous vehicle having any other level or classification. It is contemplated that the techniques discussed herein may apply to more than robotic control, such as for autonomous vehicles. For example, the techniques discussed herein may be applied to mining, manufacturing, augmented reality, etc. Moreover, even though the vehicle 102 is depicted as a land vehicle, vehicle 102 may be an aircraft, spacecraft, watercraft, and/or the like. In some examples, vehicle 102 may be represented in a simulation as a simulated vehicle. For simplicity, the discussion herein does not distinguish between a simulated vehicle and a real-world vehicle. References to a "vehicle" may therefore reference a simulated and/or a real-world vehicle.

In operation 106, the vehicle 102 may capture and analyze various sensor data to detect (or perceive) any number of additional objects in the environment (e.g., other vehicles, bicycles, pedestrians, animals, static objects, etc.), and to determine state data for the perceived objects (e.g., object classifications, sizes, shapes, positions, locations, trajectories, velocities, accelerations, etc.). As shown in this example, box 108 may represent sensor data captured by a vehicle 102 while traversing a driving environment. The sensor data in this example includes data representing an agent 110 (e.g., another vehicle) as well as number of additional agents/objects in the driving environment.

In some cases, operation 106 also may include receiving map data (e.g., road network and/or static object data) associated with the environment, or a portion thereof in which the vehicle 102 is traversing. Additionally or alternatively, operation 106 may include analyzing the sensor data to perceive road boundaries, sidewalks, crosswalks, road and traffic signal data (e.g., traffic light states, road permissibility, etc.), as well as various attributes of the driving scene itself (e.g., weather conditions, lighting conditions, road conditions, etc.).

At operation 112, the prediction component 104 may determine, for an agent perceived in the environment, a set of additional objects that are associated with (e.g., relevant to) the agent. As described above, the determination in operation 112 may include determining, for a particular agent 110, a subset of the additional objects in the environment that are relevant for predicting the future movements and/or behaviors of the agent 110. For example, as shown in box 114, the prediction component 104 has identified three additional objects in the environment that may be relevant for predicting the trajectory of the agent 110: vehicle 116, vehicle 118, and pedestrian 120.

As noted above, the subset of objects determined by the prediction component 104 for an agent may be a fixed-sized number (e.g., 4 objects, 8 objects, etc.), thereby allowing the prediction component 104 to compute attention scores using tensor operations (and/or a transformer). As shown in this example, a number of additional objects in the driving environment shown in box 114 are not included in the subset of relevant objects for the agent 110, and thus these objects may not be included in the tensor operations performed by the attention mechanism for the agent 110. In various examples, the subset of relevant objects determined for an agent 110 may or may not include the vehicle 102. Additionally, although the subset of objects in this example includes additional agents in the environment, in other examples the subset may include any combination of moving or non-moving agents, dynamic objects, and/or static objects (e.g., traffic cones, road debris, construction signs, etc.) that may be relevant for predicting the trajectory for the agent 110.

To determine the subset of objects associated with the agent 110, the prediction component 104 may use a number of techniques including heuristics and/or machine-learning models. For example, the prediction component 104 may use one or more heuristics based on object type, object size, object distance from the agent 110, orientation offset relative to the agent 110, and/or velocity offset relative to the agent 110, to determine a fixed-sized (n) subset of objects that are likely to be relevant to the agent 110. Additionally or alternatively, the prediction component 104 may use one or more trained ML models configured to output a n-sized subset of the objects that are most likely to be relevant to predicting the trajectory of the agent 110. As described below in more detail, such ML models may be trained based on training data from ML trajectory prediction models.

At operation 122, the prediction component 104 may use an ML attention mechanism to determine one or more interaction vectors associated with the agent. As described in more detail below, an attention mechanism may be used to compute an object interaction vector for an agent, including a vector (or matrix) of attention scores indicating how relevant each of the objects determined in operation 112 is for determining the next movement or behavior of the agent. As shown in box 124, the prediction component 104 may determine a set of attention queries 126 representing agent feature vectors, and a corresponding set of attention keys 128 representing the relative differences in object states (e.g., differences in position, orientation, velocity, etc.) between the agent 110 and the set of relevant objects. The prediction component 104 may use the attention queries 126 and attention keys 128 to compute (e.g., via a dot product)

a set of attention scores 130 including an object interaction vector for each agent in the environment.

Additionally, based on the attention scores in the object interaction vector, the prediction component 104 may compute a number of interaction feature vectors representing the relevance of each of the other objects to the agent. For example, the prediction component 104 may multiply the object interaction vector for an agent (e.g., the set of attention scores associated with the agent) by a set of attention values (e.g., object feature vectors for the other relevant objects to the agent). The interaction feature vectors determined for the agent 110 may represent the object features of the other relevant objects in the environment, weighted by their attention scores relative to the agent 110.

At operation 132, the prediction component 104 may use the various attention scores and/or interaction feature vectors determined in operation 122 for a particular agent, to determine a predicted trajectory for the agent within the environment. In some examples, the prediction component 104 may perform one or more inference operations using the attention mechanism to determine predicted future states data for the agent 110. For example, an inference operation may determine a predicted future position, pose, velocity, steering angle, etc., for the agent 110 at a subsequent timestep, based on the current state data for the agent 110 (e.g., current location, pose, orientation, velocity, steering angle, etc.), the map data for the agent's location in the environment, and the object data (e.g., object features and/or interaction feature vectors) associated with the other agents and static objects in the environment. After determining a next predicted state for the agent 110, the attention mechanism may be updated (e.g., based on the predicted future object features) and may be re-executed any number of times to determine a predicted trajectory for the agent 110 including a sequence of predicted states at associated timesteps over a period of time. For example, as shown in box 134, the prediction component 104 may determine a trajectory for the agent 110 including a first predicted position 110(1) for the agent 110 at a first future timestep, a second predicted position 110(2) for the agent 110 at a second future timestep, and so on.

In some examples, the attention mechanism may be used to predict (e.g., via inference using the interaction feature vectors) a single predicted movement, future position or future pose for the agent 110 at a next time step. For example, the attention mechanism may be used to determine, for an agent, which other agents and/or objects in the environment are relevant (and to what degree they are relevant) in determining predictions of future movements, positions, states, etc., for the agent. Using this data (e.g., in the form of interaction feature vectors), the prediction component 104 may perform inference operations to predict the future state data for the agent 110. In some examples, the interference operations may provide a distribution of multiple potential future states including associated probabilities, and the prediction component 104 may use sampling to determine one or multiple likely trajectories for the agent 110 based on the future state distributions at each timestep.

Additionally, as shown in this example, the prediction component 104 may perform a similar or identical set of operations (e.g., operation 112, operation 122, and operation 132) for multiple agents in the environment at each timestep (e.g., vehicle 118, pedestrian 120, etc.). As noted above, each agent in the environment may be associated with a different n-sized subset of the additional objects. In iterations of these operations for different agents, the prediction component 104 may execute the attention mechanism, for each agent, using the unique subset of objects relevant for that agent. Thus, in operation 132, the attention mechanism may generate one or more predicted trajectories for each agent in the environment at each timestep. In some examples, determining predicted trajectories for multiple agents may include determining multiple potential trajectories for each of the agents individually, and then jointly predicting a set of compatible trajectories (or multiple sets) for the group of agents, such as a set of trajectories that do not overlap and/or would not result in a potential collision or near-miss collision between the agents.

At operation 136, after determining predicted trajectories for one or more agents in the environment, the vehicle 102 may use the predicted agent trajectories to control the operation of the vehicle 102. In various examples, operation 136 may include a planner component of the vehicle 102 generating a driving route, trajectory, and/or control signals for the vehicle (e.g., braking, lights, horn, etc.) to be performed by the vehicle while navigating the environment. For instance, the planner component of the vehicle 102 may determine one or more trajectories based on the current vehicle state, an intended destination, the map data, and the positions of any obstructing static objects in the environment. The trajectory determinations for the vehicle 102 also may take into account the predicted agent trajectories determined in operation 132, in order select a trajectory for the vehicle 102 that avoids or reduces the likelihood of colliding or otherwise interacting with the other moving agents in the environment. Box 138 depicts an example showing a movement of the vehicle 102 to follow a trajectory to proceed into the intersection, which may be based at least in part on the predicted trajectories for the agent 110, the vehicle 118, the pedestrian 120, and/or any additional agents in the environment.

Figure 2:
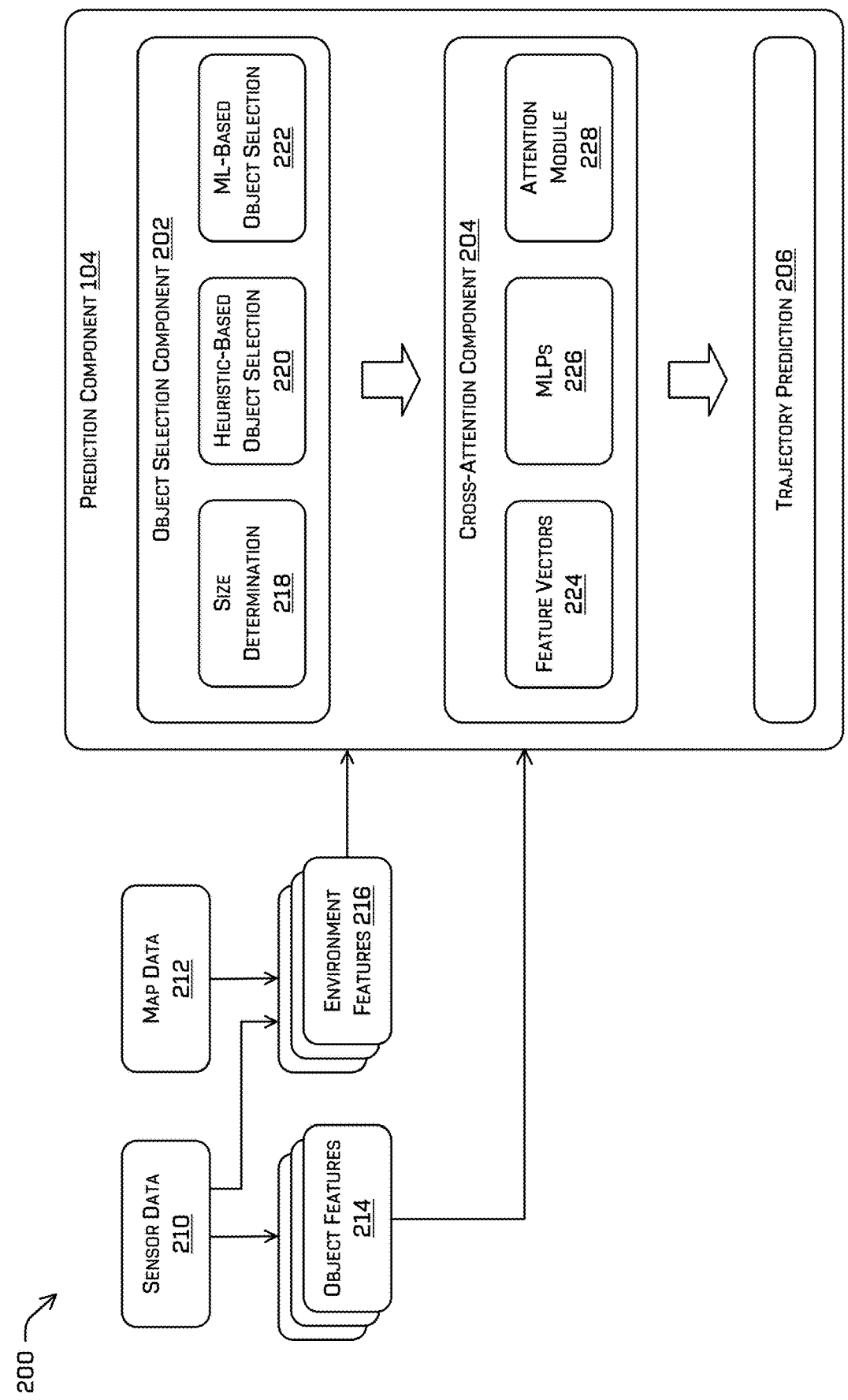
FIG. 2 depicts a block diagram of an example architecture for a prediction component including an ML attention mechanism, in accordance with one or more examples of the disclosure.

FIG. 2 depicts a system diagram 200 of an example prediction component 104 configured to determine predicted trajectories for agents in an environment. In this example, the prediction component 104 includes a number of subcomponents configured to interact to determine trajectories for the various agents in the environment, including an object selection component 202, a cross-attention component 204, and a trajectory prediction component 206. As described below in more detail, the prediction component 104 may receive object features and/or environment features representing the current state of the environment in which the vehicle 102 is operating. One or more additional agents also may be moving within the environment. For each of additional agent perceived in the environment, the prediction component 104 may use the object selection component 202 to determine a fixed-sized subset of n relevant objects associated with the agent, then may use an attention mechanism in the cross-attention component 204 to determine attention scores and/or interaction feature vectors for the agent relative to the additional relevant objects. Finally, the prediction component 104 may use the trajectory prediction component to predict trajectories for each additional agent (e.g., individually and/or jointly) based on the attention scores and/or interaction feature vectors computed using the attention mechanism.

As shown in this example, a combination of sensor data 210 and/or map data 212 may be used to generate object features 214 and/or environment features 216 representing a current state of the environment and the various objects within. In various examples, the object features 214 and environment features 216 can be generated by the sensor systems and/or perception components of a vehicle 102. However, in other examples, the prediction component 104 may receive the object features 214 and environment features 216 from any other separate sensor and/or perception systems.

The sensor data 210 may include data captured or processed by the sensors of a vehicle 102, and/or various other sensor systems in the environment. The sensor data 210 may include, for example, image data, lidar data, radar data, sonar data, and/or time-of-flight data, etc. The map data 212 may include data representing various map features (or map elements) within the environment, including but not limited to roads, lanes, curbs, shoulders, crosswalks, buildings, trees, medians, street signs, traffic signals, speed limits, etc. In some cases, the map data 212 may depict these and other types of permanent or semi-permanent map elements (e.g., road closures, road damage, construction sites, accidents, etc.), but might not include impermanent objects (e.g., vehicles, bicycles, pedestrians, temporary road features such as disabled vehicles, road hazards, or short-term construction projects) which may instead be perceived based on the sensor data 210. In some examples, the map data 212 may be configured as multi-dimensional data and may include any number of channels corresponding to the number of features associated with the environment.

As shown in this example, sensor data 210 may be used (e.g., by a perception component of the vehicle 102) to determine object features 214 representing any of the perceived and/or impermanent objects in the environment. For instance, different portions of the sensor data 210 corresponding to different objects in the environment (e.g., vehicles, pedestrians, bicycles, animals, static objects, impermanent objects, etc.) may be identified and processed to determine an object feature 214 for the perceived object. The object feature 214 may be generated and stored as a feature vector including vectorized encoded elements representing the attributes (or characteristics) of a perceived object. In some examples, the characteristics associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc.

Environment features 216 may be determined based on a combination of sensor data 210 and map data 212. For example, the map data 212 may include data representing map data features in the environment (e.g., roads, sidewalks, crosswalks, traffic signs, and signals, etc.), and the perception component of the vehicle 102 may use the sensor data 210 to confirm the map data and also to determine the precise sizes, locations, boundaries, etc. for the various map data features. In some examples, the sensor data 210 and/or map data 212 may be processed to determine a feature map representing the environment, and the environment features 216 may be extracted from the feature map at the current position of the vehicle 102, providing scene context features relative to the current position. In some examples, environment features 216 also may be stored as vectorized encoded elements representing the attributes (or characteristics) of an environment feature.

The object selection component 202 may be configured to determine, for a particular agent at a particular time in the environment, a set of objects (e.g., additional agents and/or static objects) that are relevant to the particular agent. In some examples, the object selection component 202 may determine a fixed-sized subset of the objects in the environment (e.g., a subset of 4 objects, 8 objects, etc.) that may be relevant to predicting the trajectory for the agent. In this example, the object selection component 202 includes a size determination component 218, a heuristic-based object selection component 220, and an ML-based object selection component 222.

The size determination component 218 may determine the size of the subset of objects to be determined by the object selection component 202. As noted above, the selected subset may represent the fixed-sized maximum set of additional objects within the environment that may be relevant to predicting the future movement of the agent. Because the object subset is fixed at a maximums size (e.g., regardless of the density of the driving environment), the attention mechanism can use tensor operations in a fixed-cost ML attention mechanism. However, the size determination component 218 may initially determine the size of the fixed-sized maximum object subset, for instance, based on the driving environment attributes, scene context, velocity of the vehicle 102 and/or agent 110, etc. As an example, in environments that are crowded, complex, and/or low-speed driving environments (e.g., crowded intersections, merging lanes, crosswalks, parking lots, school zones or construction zones, etc.), the size determination component 218 may select larger sized subsets to allow the attention mechanism to consider more possible agent-to-agent interactions when predicting the agent trajectory. In contrast, in environments that are less crowded, less complex, and/or higher-speed driving environments (e.g., highways, rural roads, high speed-limit roads with fewer traffic signals, etc.), the size determination component 218 may select smaller sized subsets to allow the attention mechanism to predict the agent trajectory further out in time by considering fewer possible agent-to-agent interactions in the current scene.

After determining the size of the object subset, the prediction component 104 may use one or more heuristics, ML models, and/or a combination techniques to determine the subset of objects that are associated with the particular agent at the particular time in the environment. For instance, the heuristic-based object selection component 220 may apply a set of rules to the object features 214 and environment features 216, to determine the n-sized subset of objects most likely to be relevant to predicting the trajectory of the agent. In a simple example, the heuristic-based object selection component 220 may select the fixed-size number (n) of closest objects to the agent at the current time in the environment. In more complex examples, the heuristic-based object selection component 220 may use a combination of distance, relative orientation, and/or relative velocity to determine the subset of n relevant objects for the agent. Additionally or alternatively, the heuristic-based object selection component 220 may use additional object attributes (e.g., size, object type, etc.) and/or other characteristics of the driving environment (e.g., driving lane configuration, speed limit, driving conditions, etc.) to determine the subset of n relevant objects for the agent. In any of these examples, the heuristic-based object selection component 220 also may take into account the map features and/or characteristics of the current driving scene, to determine the n-sized subset of objects associated with the particular agent. For instance, when the heuristic-based object selection component 220 determines that the agent is approaching an interaction, it may use the characteristics of the intersection (e.g., lane directionality, right-of-way, traffic signs and signals, crosswalks, etc.) to determine relevant object locations in or near the interaction, and may select the subset of objects based on the relevant object locations. As another example, when the heuristic-based object selection component 220 determines that the agent is on a highway or similar road, it may select a subset of objects further out into the horizon in the direction the agent is traveling (e.g., and may select fewer nearby objects to the left, right, or behind the agent).

Instead of (or in addition to) using heuristics, in some examples, the prediction component 104 may use the ML-based object selection component 222 to determine the subset of relevant objects for the agent. In such examples, the ML-based object selection component 222 may be trained using training data to predict which n objects in the environment are most likely to be relevant for predicting the trajectory of the agent. The training data for the ML-based object selection component 222 may include, for instance, the inputs/outputs of an ML trajectory prediction model. For instance, to train the ML-based object selection component 222 a separate ML trajectory prediction model may be executed multiple times for an agent, during which different objects in the environment are removed (or masked) from the model input. The model outputs (e.g., predicted agent trajectories) then may be compared to determine which of the objects were most relevant to determining the trajectory of the agent.

As noted above, in some examples, the object selection component 202 may update and/or re-determine the subset of relevant objects for an agent at different timesteps during the prediction of the trajectory for the agent. These examples may be advantageous when some objects are relevant and should be attended to by the agent early in the driving scene, but may no longer be relevant and need not be attended to by the agent later in the driving scene. However, in other examples, the heuristic-based object selection component 220 and/or the ML-based object selection component 222 may be configured to determine a single subset of objects for the agent that may be used by the attention mechanism at each timestep in the trajectory prediction process for the agent. In such examples, the heuristics and/or trained ML models used by the prediction component 104 may be configured to determine the likely relevance of the other objects not only at the current time, but also the likely future relevance of the objects over the time period during which the trajectory will be predicted for the agent.

After determining, using the object selection component 202, the subset of objects in the environment associated with the agent, the cross-attention component 204 may implement an ML attention mechanism to determine attention scores for each of the subset of objects (relative to the agent), and corresponding interaction feature vectors for the agent. As described below in more detail, the cross-attention component 204 may initially generate a set of feature vectors 224 for the agent and the subset of relevant objects, based on the object features 214 and/or environment features 216. In some examples, the cross-attention component 204 may use MLPs 226 to generate attention queries associated with the agents, and corresponding sets of attention keys representing the relative state differences between the pairs of agents and/or objects in the environment. An attention module 228 may be configured to compute attention scores associated with agent-object pairs, based on the attention queries and attention keys. The attention module 228 also may use the vector of attention scores associated with an agent to compute a set of interactive feature vectors for the agent, representing the other relevant objects in the environment weighted by their respective attention scores relative to the agent.

The trajectory prediction component 206 may use the various outputs of the cross-attention component 204 (e.g., attention scores and/or interaction feature vectors) to determine one or more predicted trajectories for the agent over a future period of time in the environment. As described above, the trajectory prediction component 206 may perform inference operations to determine predicted future states for an agent, based on various data including the previous and current velocity vectors of the agent, the map data, and the interaction feature vectors representing the other nearby objects in the environment. In some examples, the trajectory prediction component 206 may determine a predicted position, predicted movement, and/or other predicted state data for an agent at a subsequent timestep, by updating the attention mechanism and/or performing an inference operations based on the attention mechanism.

Each of the subcomponents of the prediction component 104 in this example may be used to predict one or more future movements/positions for any number of agents in the environment. When predicting trajectories for multiple agents in an environment, the trajectory prediction component 206 may jointly determine a set of compatible predicted trajectories for the agents. Further, as noted above, the operations described herein may be performed by the prediction component 104 recurrently to predict longer trajectories (e.g., sequences of future movements/positions) for the agents in the environment. In such examples, the sets of predicted positions and/or updated state data determined for the agents by the trajectory prediction component 206 may be used to update the current object feature vectors and/or current representation of the environment to a predicted future state, which can be provided as the input data to object selection component 202, cross-attention component 204, and trajectory prediction component 206 to determine the subsequent predicted states for the agents, objects, and environment as a whole. The process can be performed recurrently any number of times to determine longer trajectories for the agents in the environment to any desired future point in time.

Figure 3:
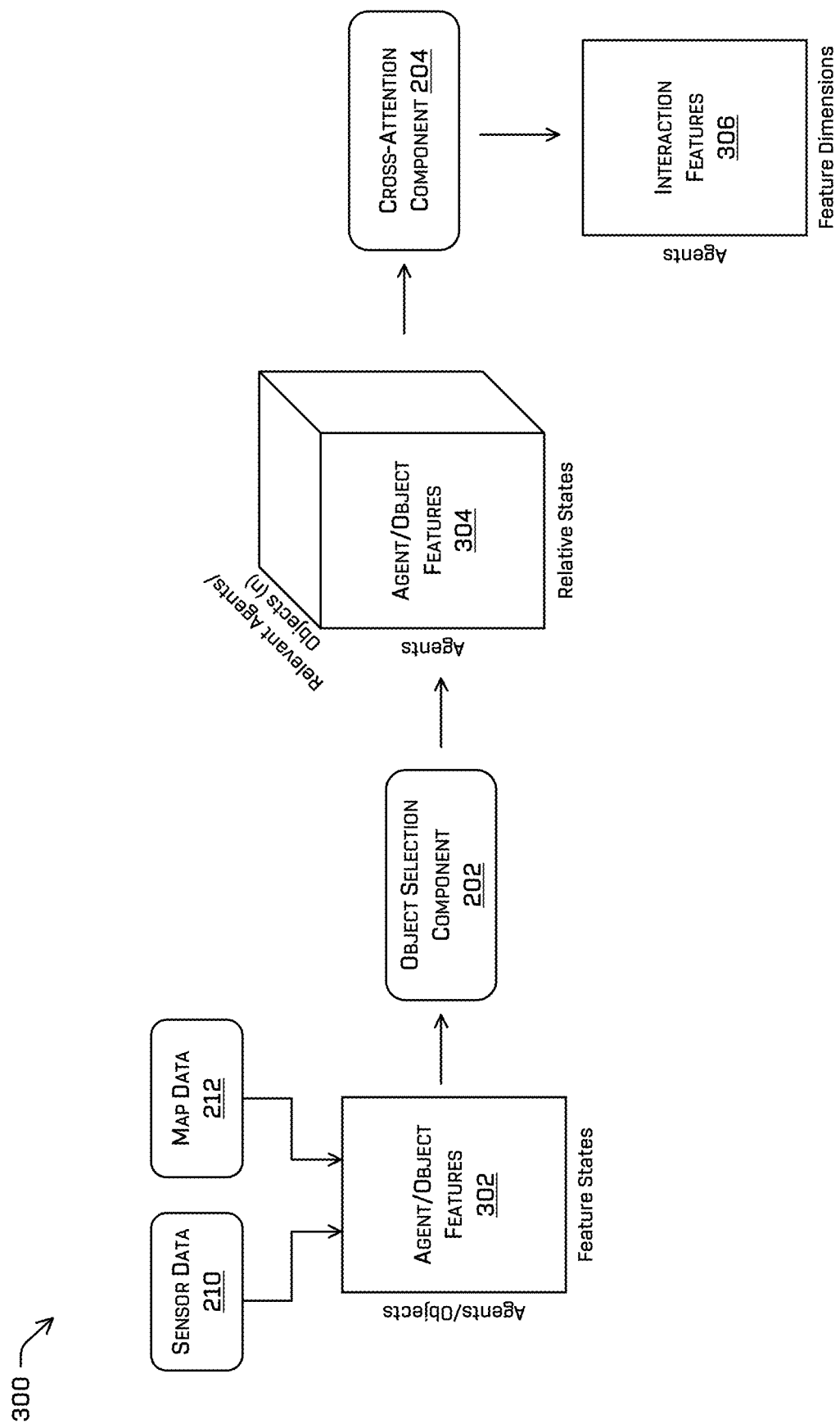
FIG. 3 illustrates an example technique for determining object interaction vectors for agents in an environment, using an ML attention mechanism, in accordance with one or more examples of the disclosure.

FIG. 3 depicts an example system 300 in which an ML attention mechanism may be used to generate agent-object interaction data as part of an agent trajectory prediction process. As shown in this example, the various agent-related and object-related data described herein may be generated and used by the prediction component 104 described in FIGS. 1 and 2.

As shown in this example, the prediction component 104 may initial create a matrix of agent/object feature data 302, based on sensor data 210 and/or map data 212. The sensor data 210 may include various data representing a current state of the environment, for example, image data, lidar data, radar data, sonar data, and/or time-of-flight data, etc. The map data 212 may include data representing various map features (or map elements) of the environment associated with the sensor data 210, including but not limited to roads, lanes, curbs, shoulders, crosswalks, buildings, trees, medians, street signs, traffic signals, speed limits, etc. In this example, the agent/object feature data 302 may include, and/or may be based on, the object features 214 and/or environment features 216 as described above. For instance, the agent/object feature data 302 may include one or more encoded vectors of feature state data for each agent and each stationary object detected (or perceived) by the sensors in the environment. The various feature states of the agents or objects in the agent/object feature data 302 may include encoded data representing positions (e.g., x-positions, y-positions, and/or z-positions), sizes, orientations, poses, types/classifications, velocities, accelerations, and/or any state data of the objects and agents at a particular time in the environment.

The object selection component 202, as described above, may be configured to determine, for each agent in the environment, a subset of associated objects (which may include other agents and/or static objects). For each agent, the subset of associated objects determined by the object selection component 202 may correspond to a set of objects likely to be relevant in predicting the trajectory of the agent. The object selection component 202 may determine different subsets of objects for the different agents at the same time point in the environment. However, as shown in this example, the size of the object subsets may be the same for each agents (e.g., 4 objects, 8 objects, etc.).

Based on the selected subsets of objects, determined by the object selection component 202 for each agent in the environment, the prediction component 104 may generate a matrix of relative state data 304. In this example, the relative state data 304 may include, for each agent perceived in the environment, the relative state data between the agent and each of the subset of additional relevant objects determined for the agent. In this example, the relative state data for each agent-object pair may include, for example, a distance between the agent and the object, the orientation difference (or offset) between the agent and the object, the velocity difference between the agent and the object, and/or any other state differences/relative offsets between the agent and the object.

The cross-attention component 204, as described herein, may be configured to perform deep learning cross attention using tensor operations on various vectors within the matrix of relative state data 304. In particular, for each agent, the cross-attention component 204 may use an attention mechanism to determine a set of attention scores for agent relative to each of the additional relevant objects determined as being relevant to the agent. In some examples, the cross-attention component 204 may use the attention scores to determine a set of interaction features 306, including one or more interaction feature vectors associated with each agent. During trajectory prediction for the agent, the set of interaction feature vectors may be used to convey edge data (e.g., data representing the relative state offsets) between the agent and each of the additional objects weighted by their respective attention scores relative to the agent.

Figure 4:
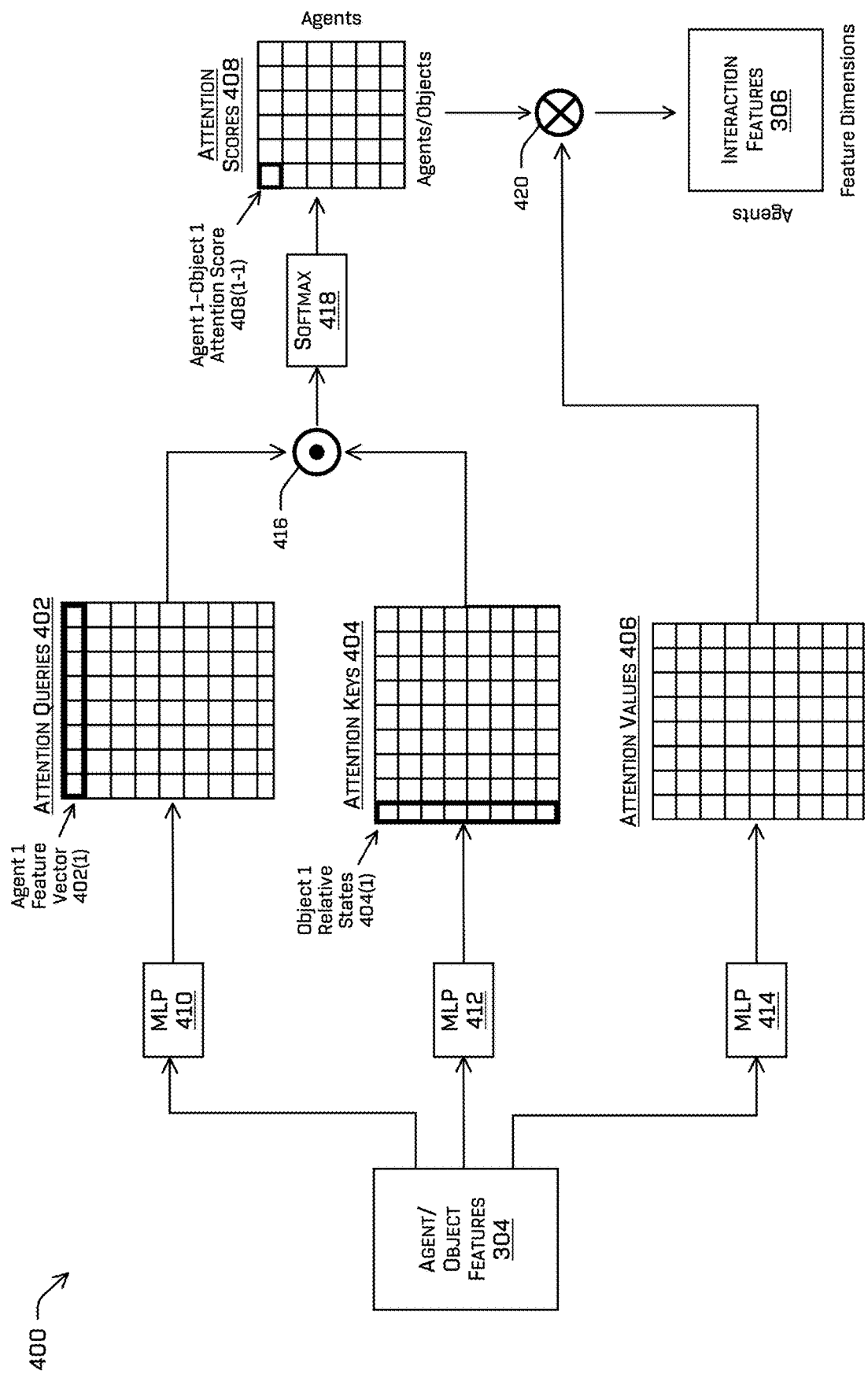
FIG. 4 illustrates an example of an attention technique for determining object interaction vectors based on agent/object vectors, in accordance with one or more examples of the disclosure.

FIG. 4 depicts an example system 400 illustrating the execution of an attention mechanism to compute attention scores between agents and associated objects, and also to compute interaction feature vectors that may be used to predict the trajectories that the agents may use to traverse the environment.

In this example, the attention mechanism may receive as input a matrix of agent/object state data 304 associated with an agent in the environment. As discussed above, the agent/object state data 304 for the agent may include the current state values and/or relative states between the agent and each of the subset of additional relevant objects determined for the agent. The attention mechanism may use a number of different MLPs to transform the state data 304 for the agent into various feature vectors for use as attention queries 402, attention keys 404, and attention values 406. In this example, a first MLP 410 may transform portions of the agent/object state data 304 into attention queries 402. The attention queries 402 may include an encoded feature vector associated with each agent, in which each agent feature vector represents a query indicating the particular combination of object features considered to be relevant to the agent (e.g., to which the agent will attend). In this example, feature vector 402(1) is an encoded feature vector representing the attention query for an agent (Agent 1) for which the prediction component 104 may determine a predicted trajectory.

A second MLP 412 in this example may transform portions of the agent/object state data 304 into attention keys 404. The attention keys 404 may include encoded feature vectors representing the relative state differences between agent-object pairs in the environment. In various examples, the attention keys 404 may represent relative distance values between pairs of objects in the environment. Additionally or alternatively, the attention keys 404 may represent additional relative state/offset data between pairs of objects in the environment, such as the relative orientations, velocities, steering angles, accelerations, etc., between object pairs. In this example, vector 404(1) may be an encoded feature vector representing the relative state differences (e.g., relative positions) between a particular object (Object 1) and a number of additional objects in the environment. The attention mechanisms described herein also may include any number of encoders/decoders (e.g., positioned before and/or after the MLPs 410, 412, and 414), so that the attention queries 402, attention keys 404, and/or attention values 406 may represent embeddings output by the encoders. In these examples, the attention operations described herein may be performed on the embeddings output by the encoders, representing respective portions of input data (e.g., tokenized data). The embeddings of attention queries 402, attention keys 404, and/or attention values 406 also may include any combination of encoded local scene information (e.g., map features/environment features, scene context data) along with the encoded feature vector data representing the object features of the agents/objects.

In some examples, the set of objects represented in attention keys 404 may be the same as the set of agents represented in the attention queries 402. In these examples, the attention mechanism may be implemented using self-attention, because the set of attending agents may be the same the set of agents being attended to. Additionally or alternatively, the attention mechanism may be implemented using cross-attention, so that set of attending agents (e.g., the agents for which trajectories are to be generated) may be different from the set of agents/objects being attended to. In such examples, using cross-attention may provide additional technical advantages by allowing the prediction component 104 to predict trajectories for certain objects (e.g., moving agents) but not for other objects in the environment (e.g., stationary agents, static objects, etc.), while allowing the attending agents to attend to any of additional objects in the environment.

As shown in this example, the prediction component 104 may use the attention mechanism to compute a set (e.g., matrix) of attention scores 408. Each attention score in the attention scores 408 may be a value representing how relevant an object is (e.g., one of the objects represented in the attention keys 404) to an agent (e.g., one of the agents represented in the attention queries 402). Each attention score in the set of the attention scores 408 may be computed (e.g., using the attention module 228) by computing a dot product 416 of an attention query and an attention key, and then performing a softmax operation 418 to determine an attention score value (e.g., between zero and one) for the agent-object pair. In this example, the attention score 408(1-1) may be determined by computing the dot product 416 of vector 402(1) (associated with Agent 1) and vector 404(1) (associated with Object 1), and then performing a softmax 418 on the dot product. The resulting attention score 408

(1-1) may provide a value indicating the degree to which Object 1 is relevant for determining the predicted trajectory of Agent 1.

Finally, the prediction component 104 may use the set of attention scores 408 to determine a set of interaction features 306. As described above, the interaction features 306 may include a set of interaction feature vectors associated with each agent, including feature vectors representing the objects in the environment, weighted by their respective attention scores relative to the agent.

FIGS. 5A-5D illustrate a top-down view of an example driving environment 500 depicted at four different times. In this example, a vehicle 102 (e.g., an autonomous vehicle) is depicted traversing the driving environment 500, starting near the top of the driving scene at the initial time (Time=T1) and moving towards the bottom of the driving scene. During this time period, the vehicle 102 may receive sensor data and/or map data of the environment 500, and may use this data to predict trajectories for one or more of the agents in the environment using the various techniques described herein. For instance, the vehicle 102 may include a prediction component 104 configured to predict a trajectory for an agent 502 approaching the vehicle 102 from the opposite direction.

Figure 5A:
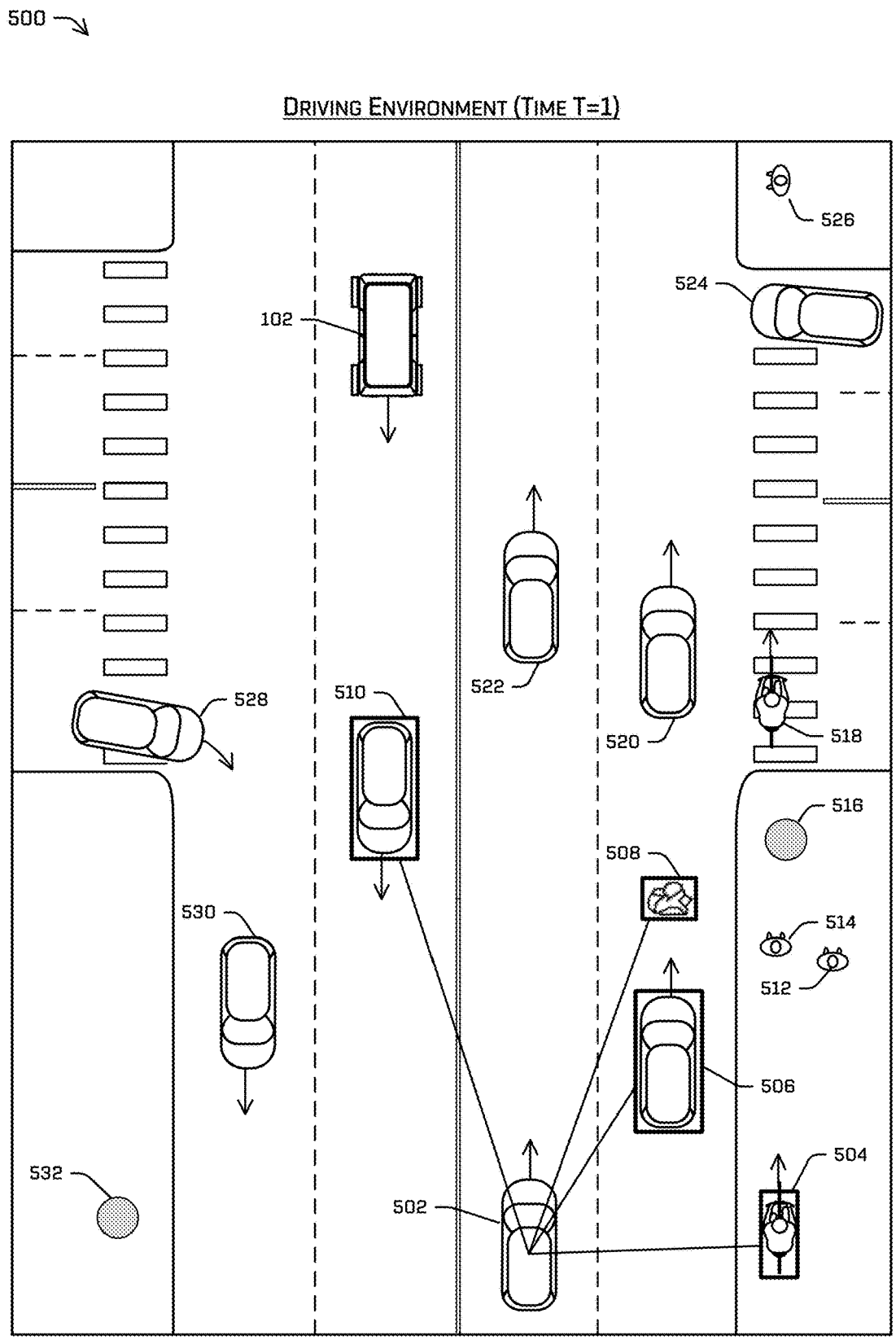
FIGS. 5A-5D depict examples of a predicted driving scene at four different times, including predicted sets of relevant objects associated with an agent in the driving scene at the different times, in accordance with one or more examples of the disclosure.
Figure 5B:
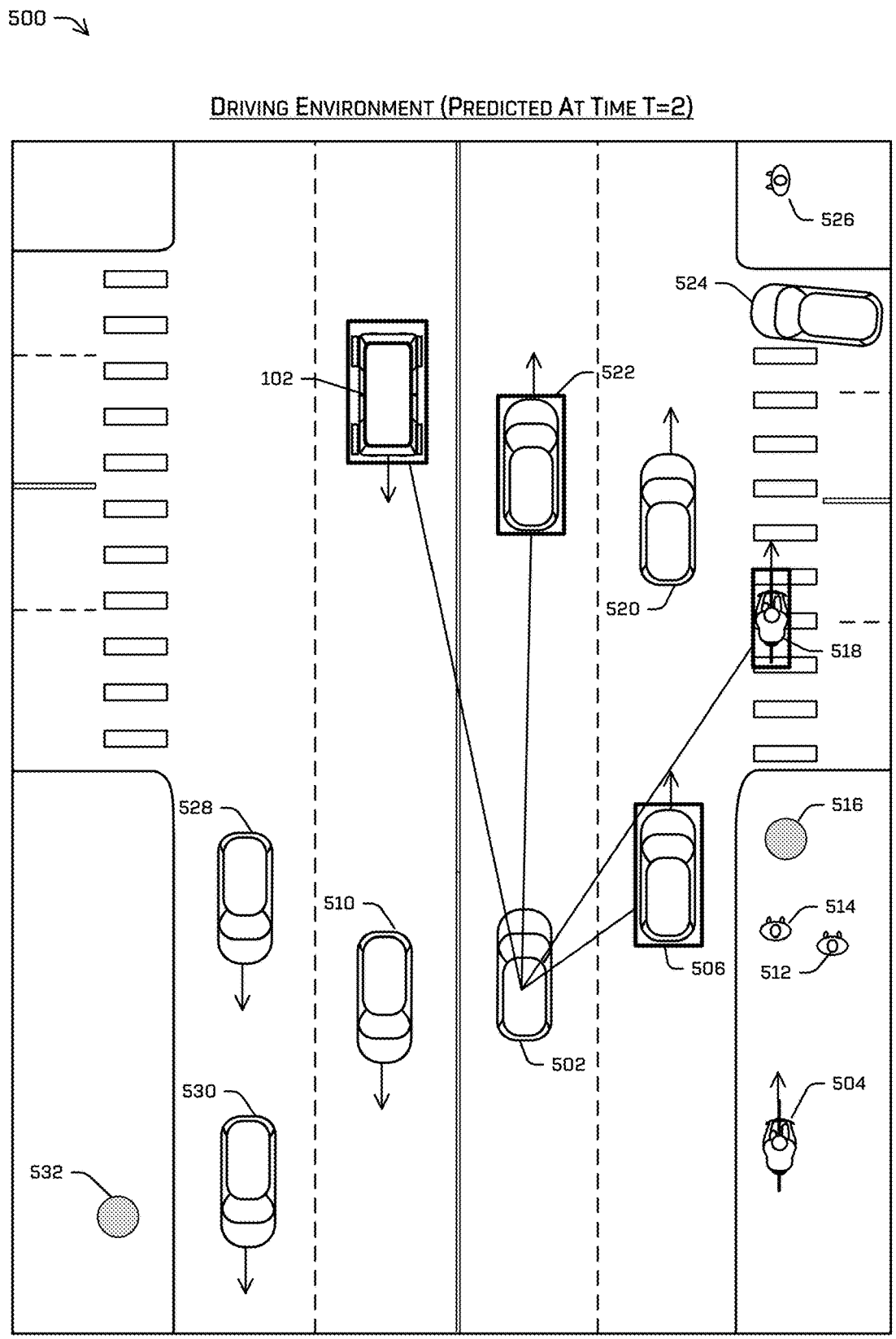
Figure 5C:
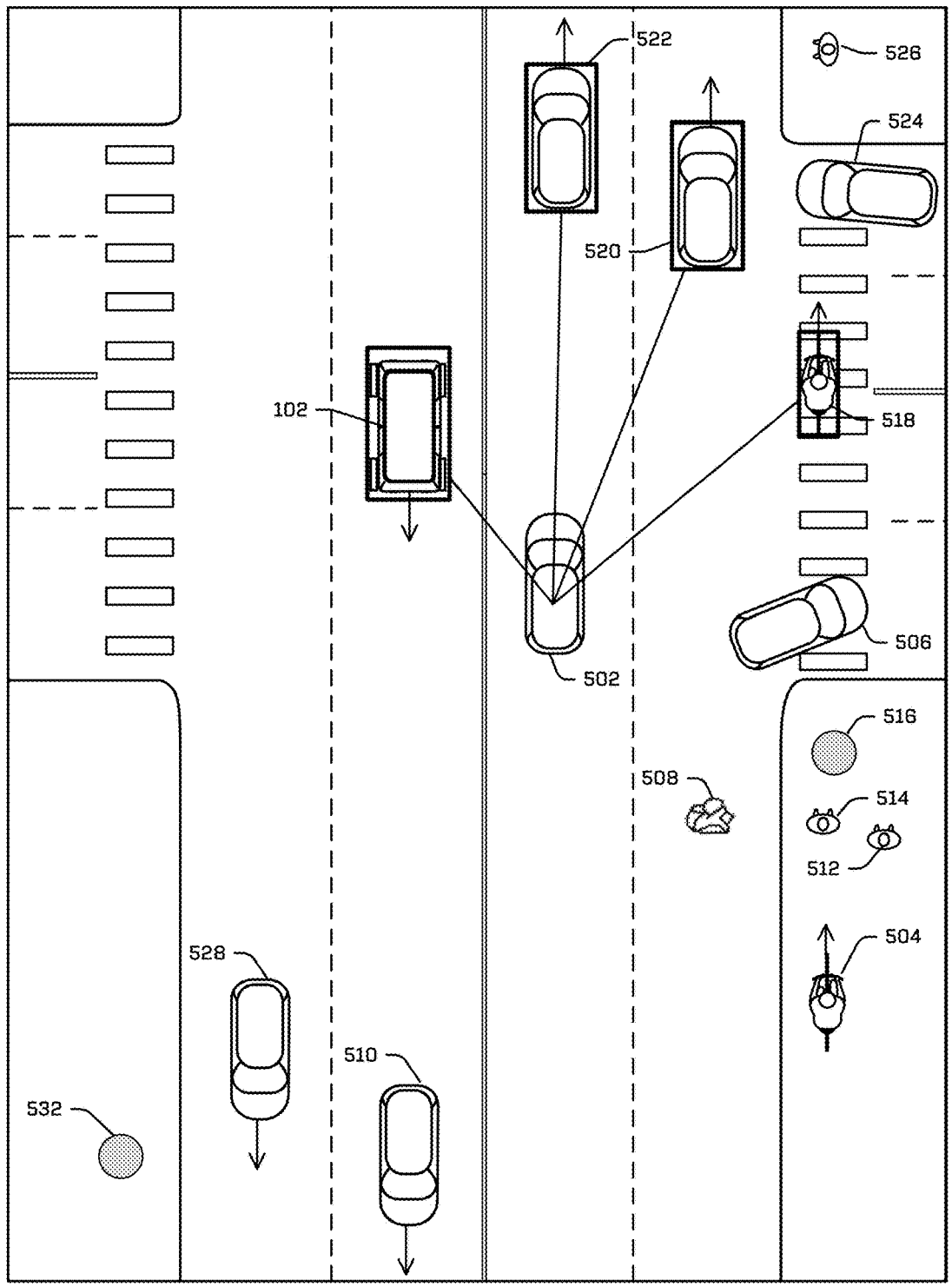
Figure 5D:
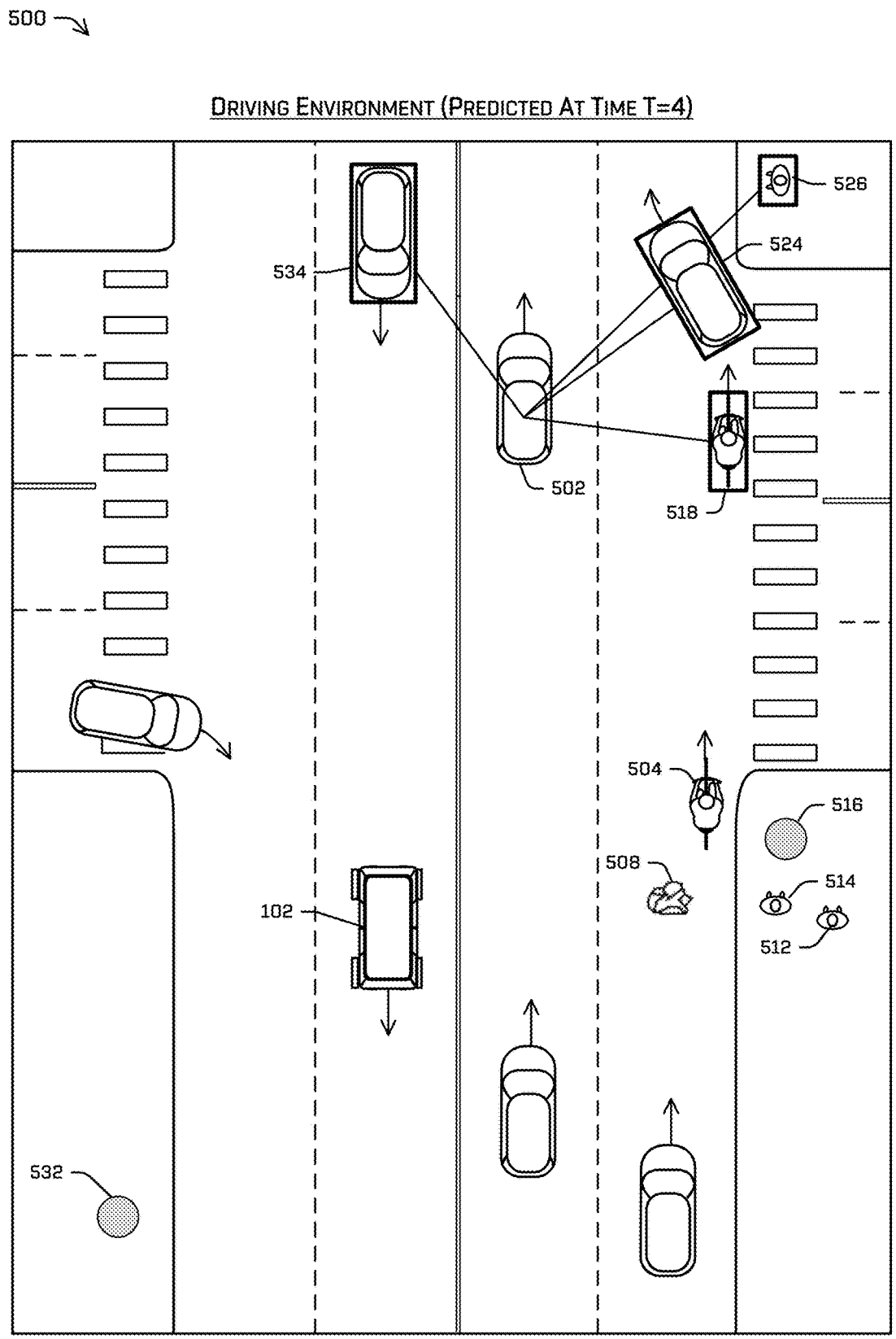

In this example, FIG. 5A may represent the driving scene as perceived by the vehicle 102 at an initial time (Time=T1) in the environment 500. FIG. 5B, FIG. 5C, and FIG. 5D may represent predictions of the state of the environment 500, made by the prediction component 104 of the vehicle 102, at three future time steps in the environment 500. As shown in these examples, each of the predicted driving scenes shown in FIG. 5B, FIG. 5C, and FIG. 5D (e.g., for Times T2, T3, and T4) include updated agent positions for several agents, which may be based on the predicted agent trajectories made by the prediction component 104 of the vehicle 102 for any number of agents in the environment.

As described above, the prediction component 104 of the vehicle 102 may use an attention mechanism to determine the predicted trajectory for the agent 502. At each timestep while predicting the trajectory for the agent 502, the object selection component 202 may determine a fixed-size set of objects associated with the agent 502 that may be relevant to determining the movement of the agent at the corresponding time step. As discussed above, the object selection component 202 may use heuristics and/or ML models to identify the subset of objects associated with the agent 502. Additionally, the object selection component 202 may determine a different subset of the objects as being relevant to the agent 502 at different time points in the environment 500.

In FIG. 5A, the driving environment 500 is depicted at an initial time (Time=T1), as perceived by the vehicle 102. Along with the agent 502, the driving environment 500 includes a number of additional agents and/or objects depicted in FIG. 5A at their positions as perceived by the vehicle 102 at Time T1. In this example, additional objects 504-532 are labeled in FIG. 5A, although any number of additional agents/objects may be present in other driving scenes. To determine a predicted trajectory for the agent 502, the vehicle may initially determine (e.g., using object selection component 202) a first subset of objects relevant to predicting the trajectory of the agent 502 at time T1. As shown in this example, at time T1 the object selection component 202 has selected objects 504, 506, 508, and 510 as the fixed-sized (n=4) subset of relevant objects for the agent 502. Using the techniques described herein, the prediction component 104 then may generate attention queries, attention keys, and attention scores for the agent 502 relative to the selected objects 504, 506, 508, and 510. The prediction component 104 also may generate interaction feature vectors representing objects 504, 506, 508, and 510, based on their respective attention scores, to be used for determining the next trajectory position and/or movement of the agent 502.

FIG. 5B depicts a predicted driving scene within the environment 500 at a subsequent time (Time=T2), as predicted by the prediction component 104 of the vehicle 102. To determine a next predicted movement or position for the agent 502, the vehicle may determine another subset of relevant objects for the agent 502 at time T2. As shown in this example, at time T2 the object selection component 202 has selected objects 506, 518, 522, and vehicle 102 as the fixed-sized subset of relevant objects for predicting the trajectory of the agent 502. Using the techniques described herein, the prediction component 104 then may again generate attention queries, attention keys, and attention scores for the agent 502 relative to the selected objects 506, 518, 522, and vehicle 102. The prediction component 104 also may generate interaction feature vectors representing objects 506, 518, 522, and vehicle 102, based on their respective attention scores, to be used for determining the next trajectory position and/or movement of the agent 502 at time T2.

FIG. 5C depicts a predicted driving scene within the environment 500 at another subsequent time (Time=T3), as predicted by the prediction component 104 of the vehicle 102. To determine a next predicted movement or position for the agent 502, the vehicle may determine another subset of relevant objects for the agent 502 at time T3. As shown in this example, at time T3 the object selection component 202 has selected objects 518, 520, 522, and vehicle 102 as the fixed-sized subset of relevant objects for predicting the trajectory of the agent 502. Using the techniques described herein, the prediction component 104 then may again generate attention queries, attention keys, and attention scores for the agent 502 relative to the selected objects 518, 520, 522, and vehicle 102. The prediction component 104 also may generate interaction feature vectors representing objects 518, 520, 522, and vehicle 102, based on their respective attention scores, to be used for determining the next trajectory position and/or movement of the agent 502 at time T3.

Finally, FIG. 5D depicts a predicted driving scene within the environment 500 at another subsequent time (Time=T4), as predicted by the prediction component 104 of the vehicle 102. To determine a next predicted movement or position for the agent 502, the vehicle may determine another subset of relevant objects for the agent 502 at time T4. As shown in this example, at time T4 the object selection component 202 has selected objects 518, 524, 526, and 534 as the fixed-sized subset of relevant objects for predicting the trajectory of the agent 502. Using the techniques described herein, the prediction component 104 then may again generate attention queries, attention keys, and attention scores for the agent 502 relative to the selected objects 518, 524, 526, and 534. The prediction component 104 also may generate interaction feature vectors representing objects 518, 524, 526, and 534, based on their respective attention scores, to be used for determining the next trajectory position and/or movement of the agent 502 at time T4.

The example shown in FIGS. 5A-5D describes determining different subsets of objects at different timesteps during a trajectory prediction for the agent 502. Although this example relates to agent 502, the prediction component 104 may use similar or identical techniques during the same process to determine unique subsets of relevant objects for any other agents in the environment 500, and to use the attention mechanism as described herein to predict the subsequent movements and trajectories for the other agents.

Figure 6:
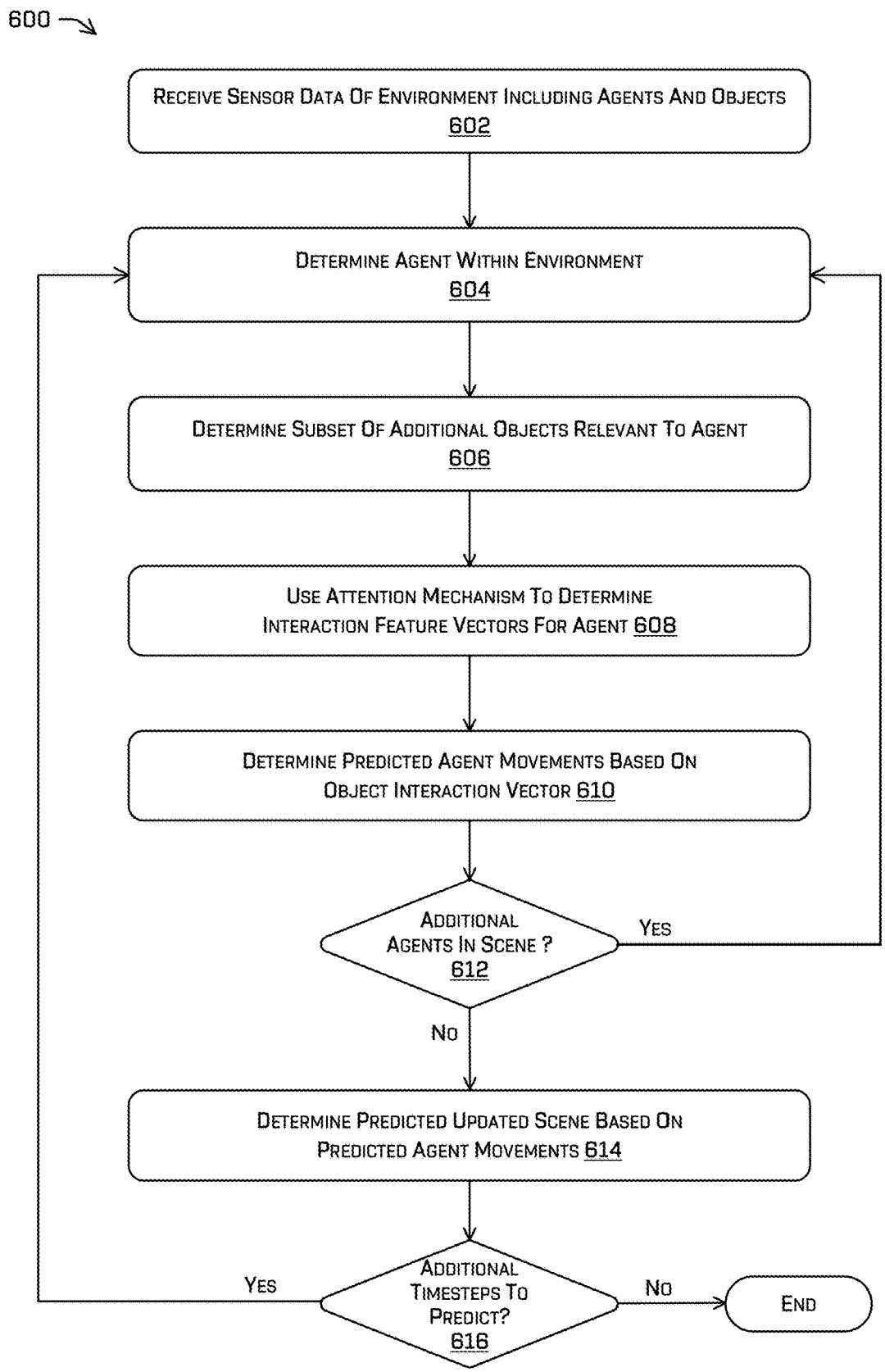
FIG. 6 is a flow diagram illustrating an example process for determining predicted agent trajectories in an environment using an ML attention mechanism, in accordance with one or more examples of the disclosure.

FIG. 6 is a flow diagram illustrating an example process 600 for determining predicted agent trajectories in an environment using an attention mechanism. As described herein, the operations of process 600 may be performed by a prediction component 104 (including the additional related components or subcomponents) described above in reference to FIGS. 1-5. For example, as described below, the example process 600 may be performed by a prediction component 104 within a vehicle 102, including an object selection component 202, a cross-attention component 204 configured to execute an ML attention mechanism, and a trajectory prediction component 206.

At operation 602, the prediction component 104 may receive sensor data representing an environment. In some examples, the sensor data may be captured by the sensors of an autonomous vehicles (e.g., vehicle 102) or other sensor-based prediction system operating in the environment. As described above, the prediction component 104 also may receive and use map data in conjunction with the sensor data, to perceive agents and additional objects in the environment. In various examples, the sensor data received in operation 602 may include raw sensor data and/or processed/encoded sensor data representing various objects and features in the environment. For instance, the sensor data may be received via a perception component of the vehicle 102, as a set of object features 214 and/or environment features 216.

At operation 604, the prediction component 104 may determine a perceived agent within the environment for which the prediction component 104 may predict a trajectory. As described above, the techniques herein may be used on environments including any number of agents and/or other objects. Depending on the environment, the scene context, and/or the computing system capabilities of the vehicle 102, the prediction component 104 may determine trajectories for all of the agents in the environment or a selected subset of the agents. For instance, the prediction component 104 may determine trajectories for moving agents but not for stationary agents, agents of certain types (e.g., vehicles) but not other types (e.g., pedestrians), and/or may determine trajectories for nearby agents (e.g., with a distance threshold) but not for agents that are farther away, etc.

At operation 606, the prediction component 104 may determine, for the agent selected in operation 604, a subset of additional objects (e.g., agents and/or stationary objects) associated with the selected agent. As described above, the subset of objects determined for an agent may be a fixed-sized set of the additional objects in the environment, so that the object feature vectors and relative state information may be stored in tensors and the attention mechanism to use standard deep learning cross-attention on the tensors to process and aggregate the relative state information. To determine the subset of additional objects that are associated with the selected agent at a particular time, the prediction component 104 may use an object selection component 202 configured to use heuristics and/or ML models to select the subset of objects that are likely to be relevant for predicting the trajectory of the agent at that time.

At operation 608, the prediction component 104 may use an attention mechanism to determine attention scores and/or interaction feature vectors associated with the agent. In some examples, the prediction component 104 may use the attention mechanism to compute a matrix of attention scores associated with agent-object pairs, representing how relevant the object is for predicting the trajectory of the agent at that time. As discussed above, attention scores may be computed using a cross-attention component 204 based on the dot product of attention queries and attention keys. The resulting attention score may represent the degree to which the object is relevant for determining the predicted trajectory of the agent. Finally, the prediction component 104 also may use the set of attention scores to determine interaction feature vectors for the agent, including feature vectors representing the objects in the environment weighted by their respective attention scores relative to the agent.

At operation 610, the prediction component 104 may determine one or more predicted movements (and/or predicted positions, states, etc.) for the agent, based on the interaction feature vectors determined in operation 608. In some examples, the prediction component may use a trajectory prediction component 206 to determine one or more predicted movements and/or trajectories for the agent over a future period of time, based on the attention scores and/or interaction feature vectors determined via the cross-attention component. The trajectory prediction component 206 may perform various inference operations to determine predicted future states for the agent, based on various data including the previous and current velocity vectors of the agent, the map data, and the interaction feature vectors representing the other nearby objects in the environment. In various examples, operation 610 may include determining a predicted position, predicted movement, and/or other predicted state data for an agent at a subsequent timestep, by updating the attention mechanism and/or performing an inference operations based on the attention mechanism.

As described above, the operations described herein for using an attention mechanism to determine a predicted agent trajectory may be performed for any number of agents in the environment. At operation 612, the prediction component 104 may determine whether there are any additional agents in the environment for which a trajectory is to be predicted. If one or more additional agents in the scene for which predicted trajectories are required (612: Yes), then process 600 may return to operation 604 to determine the additional agents and use the attention mechanisms described herein to determine predicted trajectories for the additional agents. Additionally, this example depicts the determination of multiple agent trajectories as serial/sequential, in other examples these techniques may be performed in parallel (e.g., on a parallel processing device such as a graphics processing unit (GPU)), to predict agent states and/or trajectories for any number of agents in the environment at a single timestep in parallel.

When no additional agents present in the scene are required to have trajectories predicted by the prediction component 104 (e.g., stationary agents, etc.) (612:No), then at operation 614 the prediction component 104 may determine a predicted updated scene in the environment, based on various predicted agent movements and/or positions determined in above operations. As described above, when predicting trajectories for multiple agents in the same environment at the same timestep, the prediction component 104 may jointly determine a set (or multiple alternative sets) of compatible predicted trajectories for the agents.

The operations described herein can be performed once to determine predicted future positions/states for various agents in the environment, or may be performed any number of times (e.g., iteratively and/or recurrently) to determine predicted trajectories for the various agents over a period of time represented by any number of future timesteps. At operation 616, the prediction component 104 may determine whether there are additional timesteps to be predicted within the agent trajectory predictions. When the prediction component 104 determines that there are additional timesteps to be predicted for the agents (616:Yes), then process 600 may return to operation 604 to determine the additional predicted movements/positions for the additional timesteps of the predicted trajectory. In contrast, when the prediction component 104 determines that there are no additional timesteps to be predicted for the agents (616:No), then process 600 may end at output the set(s) of trajectories predicted for the agents based on the cross-attention mechanism.

Figure 7:
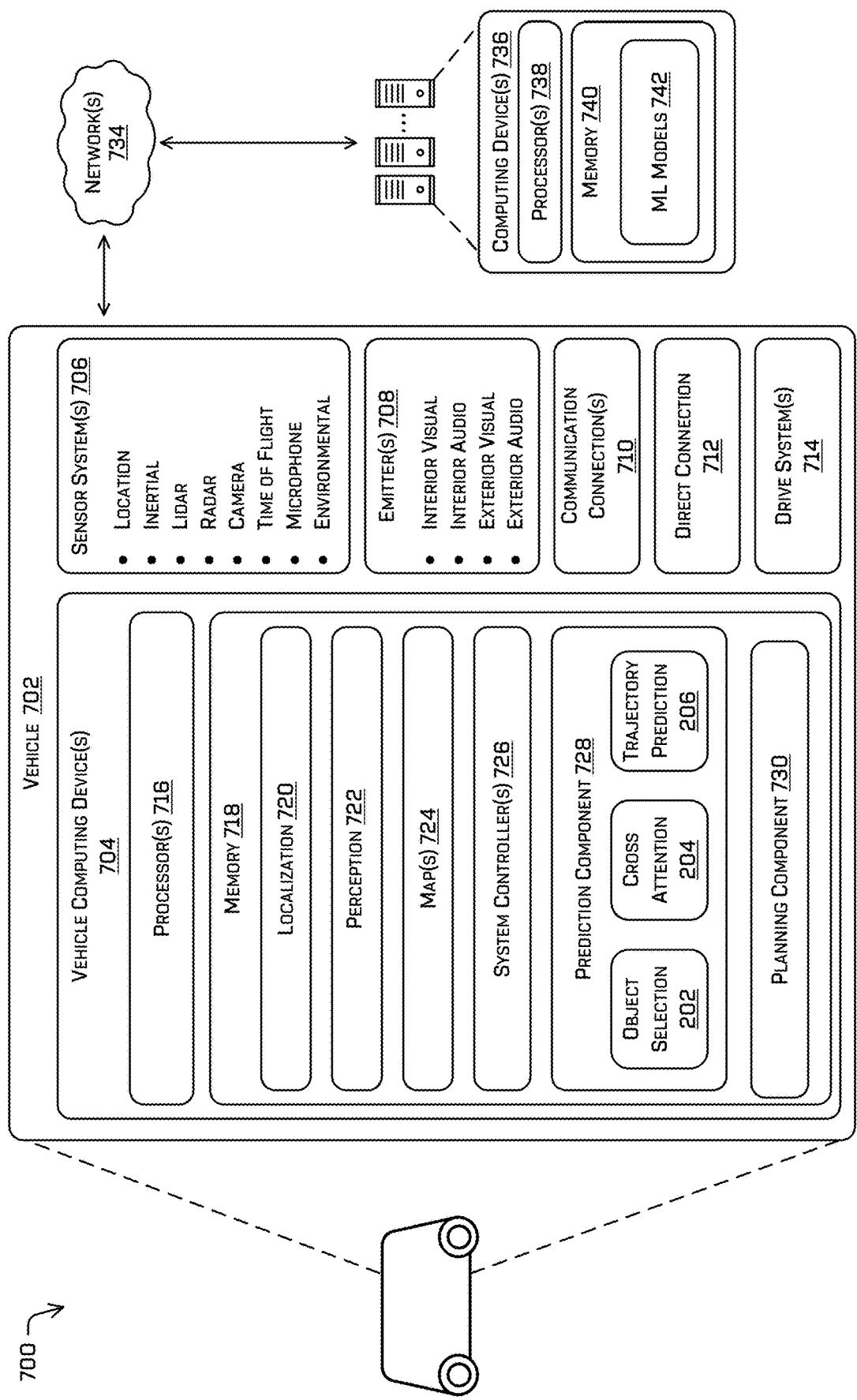
FIG. 7 is a block diagram illustrating an example architecture including a vehicle and a computing system, in accordance with one or more examples of the disclosure.

FIG. 7 illustrates a block diagram of an example system 700 that implements the techniques discussed herein. In some instances, the example system 700 may include a vehicle 702, which may represent the vehicle 102 discussed above in FIG. 1-5. In some instances, the vehicle 702 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 702 may be a fully or partially autonomous vehicle having any other level or classification. Moreover, in some instances, the techniques described herein may be usable by non-autonomous vehicles as well.

The vehicle 702 may include vehicle computing device(s) 704, sensor(s) 706, emitter(s) 708, network interface(s) 710, at least one direct connection 712 (e.g., for physically coupling with the vehicle to exchange data and/or to provide power), and one or more drive system(s) 714. In this example, the vehicle 702 may correspond to vehicle 102 discussed above. The system 700 may additionally or alternatively comprise computing device(s) 704.

In some instances, the sensor(s) 706 may include lidar sensors, radar sensors, ultrasonic transducers, sonar sensors, location sensors (e.g., global positioning system (GPS), compass), inertial sensors (e.g., inertial measurement units (IMUs), accelerometers, magnetometers, gyroscopes), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors), etc. The sensor(s) 706 may include multiple instances of each of these or other types of sensors. For instance, the radar sensors may include individual radar sensors located at the corners, front, back, sides, and/or top of the vehicle 702. As another example, the cameras may include multiple cameras disposed at various locations about the exterior and/or interior of the vehicle 702. The sensor(s) 706 may provide input to the vehicle computing device(s) 704 and/or to computing device(s) 736.

The vehicle 702 may also include emitter(s) 708 for emitting light and/or sound, as described above. The emitter(s) 708 in this example may include interior audio and visual emitter(s) to communicate with passengers of the vehicle 702. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners), and the like. The emitter(s) 708 in this example may also include exterior emitter(s). By way of example and not limitation, the exterior emitter(s) in this example include lights to signal a direction of travel or other indicator of vehicle action (e.g., indicator lights, signs, light arrays), and one or more audio emitter(s) (e.g., speakers, speaker arrays, horns,) to audibly communicate with pedestrians or other nearby vehicles, one or more of which comprising acoustic beam steering technology.

The vehicle 702 may also include network interface(s) 710 that enable communication between the vehicle 702 and one or more other local or remote computing device(s). For instance, the network interface(s) 710 may facilitate communication with other local computing device(s) on the vehicle 702 and/or the drive systems(s) 714. Also, the network interface(s) 710 may additionally or alternatively allow the vehicle to communicate with other nearby computing device(s) (e.g., other nearby vehicles, traffic signals, etc.). The network interface(s) 710 may additionally or alternatively enable the vehicle 702 to communicate with computing device(s) 736. In some examples, computing device(s) 736 may comprise one or more nodes of a distributed computing system (e.g., a cloud computing architecture).

The network interface(s) 710 may include physical and/or logical interfaces for connecting the vehicle computing device(s) 704 to another computing device or a network, such as network(s) 734. For example, the network interface(s) 710 may enable Wi-Fi-based communication such as via frequencies defined by the IEEE 200.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s). In some instances, the vehicle computing device(s) 704 and/or the sensor(s) 706 may send sensor data, via the network(s) 734, to the computing device(s) 736 at a particular frequency, after a lapse of a predetermined period of time, in near real-time, etc.

In some instances, the vehicle 702 may include one or more drive systems(s) 714 (or drive components). In some instances, the vehicle 702 may have a single drive system 714. In some instances, the drive system(s) 714 may include one or more sensors to detect conditions of the drive system(s) 714 and/or the surroundings of the vehicle 702. By way of example and not limitation, the sensor(s) of the drive systems(s) 714 may include one or more wheel encoders (e.g., rotary encoders) to sense rotation of the wheels of the drive components, inertial sensors (e.g., inertial measurement units, accelerometers, gyroscopes, magnetometers) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive systems(s) 714. In some cases, the sensor(s) on the drive systems(s) 714 may overlap or supplement corresponding systems of the vehicle 702 (e.g., sensor(s) 706).'

The drive systems(s) 714 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive systems(s) 714 may include a drive component controller which may receive and preprocess data from the sensor(s) and to control operation of the various vehicle systems. In some instances, the drive component controller may include one or more processors and memory communicatively coupled with the one or more processors. The memory may store one or more components to perform various functionalities of the drive systems(s) 714. Furthermore, the drive systems(s) 714 may also include one or more communication connection(s) that enable communication by the respective drive component with one or more other local or remote computing device(s).

The vehicle computing device(s) 704 may include processor(s) 716 and memory 718 communicatively coupled with the one or more processors 716. Memory 718 may represent memory 208. Computing device(s) 736 may also include processor(s) 738, and/or memory 740. The processor(s) 716 and/or 738 may be any suitable processor capable of executing instructions to process data and perform operations as described herein. By way of example and not limitation, the processor(s) 716 and/or 738 may comprise one or more central processing units (CPUs), graphics processing units (GPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 718 and/or 740 may be examples of non-transitory computer-readable media. The memory 718 and/or 740 may store an operating system and one or more software applications, instructions, programs, and/or data to implement the methods described herein and the functions attributed to the various systems. In various implementations, the memory may be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 718 and/or memory 740 may store a localization component 720, perception component 722, maps 724, system controller(s) 726, prediction component 728, and/or planning component 730. The prediction component 728 may represent the prediction component 104 described in the examples herein, and may include one or more of an object selection component 202, a cross-attention component 204, and a trajectory prediction component 206 as described in the examples herein.

In at least one example, the localization component 720 may include hardware and/or software to receive data from the sensor(s) 706 to determine a position, velocity, and/or orientation of the vehicle 702 (e.g., one or more of an x-, y-, z-position, roll, pitch, or yaw). For example, the localization component 720 may include map(s) of an environment and can continuously determine a location, velocity, and/or orientation of the autonomous vehicle within the map(s). In some instances, the localization component 720 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some instances, the localization component 720 may provide data to various components of the vehicle 702 to determine an initial position of an autonomous vehicle for generating a trajectory and/or for generating map data, as discussed herein. In some examples, localization component 720 may provide, to the planning component 730 and/or to the prediction component 728, a location and/or orientation of the vehicle 702 relative to the environment and/or sensor data associated therewith.

The memory 718 can further include one or more maps 724 that can be used by the vehicle 702 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In one example, a map can include a three-dimensional mesh generated using the techniques discussed herein. In some instances, the map can be stored in a tiled format, such that individual tiles of the map represent a discrete portion of an environment, and can be loaded into working memory as needed. In at least one example, the one or more maps 724 may include at least one map (e.g., images and/or a mesh) generated in accordance with the techniques discussed herein. In some examples, the vehicle 702 can be controlled based at least in part on the maps 724. That is, the maps 724 can be used in connection with the localization component 720, the perception component 722, and/or the planning component 730 to determine a location of the vehicle 702, identify objects in an environment, and/or generate routes and/or trajectories to navigate within an environment.

In some instances, the perception component 722 may comprise a primary perception system and/or a prediction system implemented in hardware and/or software. The perception component 722 may detect object(s) in in an environment surrounding the vehicle 702 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, and/or acceleration associated with an object), and/or the like. Data determined by the perception component 722 is referred to as perception data.

In some examples, sensor data and/or perception data may be used to generate an environment state that represents a current state of the environment. For example, the environment state may be a data structure that identifies object data (e.g., object position, area of environment occupied by object, object heading, object velocity, historical object data), environment layout data (e.g., a map or sensor-generated layout of the environment), environment condition data (e.g., the location and/or area associated with environmental features, such as standing water or ice, whether it's raining, visibility metric), sensor data (e.g., an image, point cloud), etc. In some examples, the environment state may include a top-down two-dimensional representation of the environment and/or a three-dimensional representation of the environment, either of which may be augmented with object data. In yet another example, the environment state may include sensor data alone. In yet another example, the environment state may include sensor data and perception data together.

The prediction component 728 can receive sensor data from the sensor system(s) 706, map data, and/or perception data output from the perception component 722 (e.g., processed sensor data), and can output predictions associated with one or more objects within the environment of the autonomous vehicle. As described herein, the prediction component 728 can include a cross-attention component 204 configured to use an attention mechanism to determine a set of attention scores for each agent in the environment relative to the unique subset of objects associated with the agent. The prediction component 728 also may include one or more trajectory prediction subcomponents 206 configured to use ML prediction models trained using the various techniques described herein, to predict trajectories (and/or other future state data) associated with the agents in the environment in which the vehicle 702 is operating. In this example, the prediction component 728 may correspond to the prediction component 104 discussed above, and the prediction models used by the prediction component 728 may include any of the various attention mechanisms, MLPs, and/or other ML-based prediction models described herein. In some examples, the prediction models 732 may comprise one or more RNNs, CNNs, GNNs, attention mechanisms, and/or other ML models that are trained to jointly predict trajectories of multiple agents based at least in part on the sensor data and/or the perception data. In some examples, the prediction models 732 of the vehicle 702 may be transmitted from the computing device(s) 736 to the vehicle 702 (and/or any number of additional vehicles) after the prediction models have been trained wholly or in part by the computing device(s) 736, using a training component. For example, the computing device(s) 736 may train and store a repository of ML models 742 used for trajectory prediction and/or other prediction-related tasks. The ML models 742 may include ML attention mechanisms, other ML-based prediction models, and/or models used by ML-based object selection components 222 to determine the subset of objects that may be relevant for predicting the trajectory of an agent.

The planning component 730 may receive a location and/or orientation of the vehicle 702 from the localization component 720, perception data from the perception component 722, and/or predicted trajectories from the prediction component 728, and may determine instructions for controlling operation of the vehicle 702 based at least in part on any of this data. In some examples, determining the instructions may comprise determining the instructions based at least in part on a format associated with a system with which the instructions are associated (e.g., first instructions for controlling motion of the autonomous vehicle may be formatted in a first format of messages and/or signals (e.g., analog, digital, pneumatic, kinematic) that the system controller(s) 726 and/or drive systems(s) 714 may parse/cause to be carried out, second instructions for the emitter(s) 708 may be formatted according to a second format associated therewith). In at least one example, the planning component 730 may comprise a nominal trajectory generation subcomponent that generates a set of candidate trajectories, and selects a trajectory for implementation by the drive systems(s) 714 based at least in part on determining a cost associated with a trajectory according to U.S. patent application Ser. No. 16/517,506, filed Jul. 19, 2019 and/or U.S. patent application Ser. No. 16/872,284, filed May 11, 2020, the entirety of which are incorporated herein for all purposes.

The memory 718 and/or 740 may additionally or alternatively store a mapping system (e.g., generating a map based at least in part on sensor data), a planning system, a ride management system, etc. Although localization component 720, perception component 722, the prediction component 728, the planning component 730, and/or system controller(s) 726 are illustrated as being stored in memory 718, any of these components may include processor-executable instructions, machine-learned model(s) (e.g., a neural network), and/or hardware and all or part of any of these components may be stored on memory 740 or configured as part of computing device(s) 736.

As described herein, the localization component 720, the perception component 722, the prediction component 728, the planning component 730, and/or other components of the system 700 may comprise one or more ML models. For example, the localization component 720, the perception component 722, the prediction component 728, and/or the planning component 730 may each comprise different ML model pipelines. The prediction component 728 may use a different ML model or a combination of different ML models in different circumstances. For example, the prediction component 728 may use different GNNs, RNNs, CNNs, MLPs and/or other neural networks tailored to outputting predicted agent trajectories in different seasons (e.g., summer or winter), different driving conditions and/or visibility conditions (e.g., times when border lines between road lanes may not be clear or may be covered by snow), and/or based on different crowd or traffic conditions (e.g., more conservative trajectories in a crowded traffic conditions such as downtown areas, etc.). In various examples, any or all of the above ML models may comprise an attention mechanism, GNN, and/or any other neural network. An exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, and the like.

Memory 718 may additionally or alternatively store one or more system controller(s) 726, which may be configured to control steering, propulsion, braking, safety, emitters, communication, and other systems of the vehicle 702. These system controller(s) 726 may communicate with and/or control corresponding systems of the drive systems(s) 714 and/or other components of the vehicle 702.

In an additional or alternate example, vehicle 702 and/or computing device(s) 736 may communicate (e.g., transmit and/or receive messages over network(s) 734) with one or more passenger devices (not shown). A passenger device may include, for example, a smart phone, portable computer such as a laptop or tablet, wearable device (e.g., smart glasses, smart watch, earpiece), and/or the like. Although a passenger device may be a device associated with a passenger that is discrete from device(s) of the autonomous vehicle, it is contemplated that the passenger device may be a sub-system and/or a device of the vehicle 702. For example, the passenger device may additionally or alternatively comprise a display and/or one or more input/output devices, such as a touchscreen, microphone, speaker, and/or the like. In some examples, the vehicle 702 may transmit messages and/or receive messages from the passenger device.

It should be noted that while FIG. 7 is illustrated as a distributed system, in alternative examples, components of the vehicle 702 may be associated with the computing device(s) 736 and/or components of the computing device(s) 736 may be associated with the vehicle 702. That is, the vehicle 702 may perform one or more of the functions associated with the computing device(s) 736, and vice versa.

Example Clauses

A. A system comprising: one or more processors; and one or more non-transitory computer-readable media storing computer-executable instructions that, when executed, cause the one or more processors to perform operations comprising: receiving sensor data of an environment captured by a sensor of an autonomous vehicle, wherein the environment includes a first agent and a plurality of additional objects; determining, from the plurality of additional objects, a first subset of objects associated with the first agent, the first subset including a first object and a second object; determining a first feature vector associated with the first agent at a first time in the environment; determining a second vector of relative state data associated with the first agent at the first time, based at least in part on first state data associated with the first object and second state data associated with the first object; determining an object interaction vector associated with the first agent, based at least in part on a dot product of: the first feature vector; and the second vector of relative state data, wherein the object interaction vector includes a first attention score associated with the first object and a second attention score associated with the second object; determining, based at least in part on the object interaction vector, a predicted trajectory for the first agent within the environment; and controlling the autonomous vehicle based at least in part on the predicted trajectory for the first agent.

B. The system of paragraph A, the operations further comprising: determining, from the plurality of additional objects, a second subset of objects associated with a second agent in the environment, wherein the second subset of objects is different from the first subset of objects; determining a second object interaction vector associated with the second agent, based at least in part on: a third feature vector associated with the second agent at the first time in the environment; and a fourth vector of relative state data associated with the second agent at the first time; and determining, based at least in part on the second object interaction vector, a second predicted trajectory for the second agent within the environment, wherein controlling the autonomous vehicle based at least in part on the second predicted trajectory for the second agent.

C. The system of paragraph A, wherein determining the first subset of objects associated with the first agent comprises applying a heuristic to the plurality of additional objects, wherein the heuristic is based at least in part on at least one of: an object position relative to a position of the first agent; an object orientation relative to an orientation of the first agent; an object velocity relative to a velocity of the first agent; or an attribute of the environment.

D. The system of paragraph A, wherein determining the first subset of objects associated with the first agent comprises: determining a representation of the environment at the first time, based at least in part on the sensor data; and providing the representation as input to a machine learning model configured to output a set of objects relevant to determining a predicted trajectory for the first agent.

E. The system of paragraph A, wherein the object interaction vector is associated with the first time in the environment, and wherein determining the predicted trajectory for the first agent comprises: determining, based at least in part on the object interaction vector associated with the first agent, a first predicted movement of the first agent associated with the first time; determining, based at least in part on the first predicted movement of the first agent, a predicted representation of the environment at a second time after the first time; determining, based at least in part on the predicted representation of the environment at the second time, a second subset of objects associated with the first agent at the second time, wherein the second subset of objects is different from the first subset of objects; and determining, based at least in part on the second subset of objects, a second object interaction vector associated with the first agent at the second time; and determining, based at least in part on the second object interaction vector associated with the first agent, a second predicted movement of the first agent associated with the second time.

F. A method comprising: receiving sensor data associated with an environment at a first time, the environment including a first agent and a plurality of additional objects; determining, from the plurality of additional objects, a first subset of objects associated with the first agent relevant to a future state of the first agent, the first subset including a first object and a second object, wherein the first subset is limited to a maximum number of objects; determining a first object interaction vector between the first agent and the first object;

determining a second object interaction vector between the first agent and the second object; encoding the first object interaction vector and the second object interaction vector into a data structure wherein, in the data structure, the first object interaction vector and the second object interaction vector are associated with the first agent, and wherein a number of object interaction vectors for the first agent is limited to the maximum number of objects; and determining, based at least in part on the data structure, a predicted trajectory for the first agent within the environment.

G. The method of paragraph F, further comprising: determining, from the plurality of additional objects, a second subset of objects relevant to a future state of a second agent in the environment, the second subset including the first object and a third object, wherein the second subset of objects is different from the first subset of objects, and wherein the second subset is limited to the maximum number of objects; determining a third object interaction vector between the second agent and the first object; determining a fourth object interaction vector between the second agent and the third object; encoding the third object interaction vector and the fourth object interaction vector into a second data structure; and determining, based at least in part on the second data structure, a second predicted trajectory for the second agent within the environment.

H. The method of paragraph G, wherein: the second agent is included in the first subset of objects; and the first agent is not included in the second subset of objects.

I. The method of paragraph F, wherein determining the first subset of objects comprises applying a heuristic to the plurality of additional objects, wherein the heuristic is based at least in part on at least one of: an object position relative to a position of the first agent; an object orientation relative to an orientation of the first agent; an object velocity relative to a velocity of the first agent; or an attribute of the environment.

J. The method of paragraph F, wherein determining the first subset of objects comprises: determining a representation of the environment at the first time, based at least in part on the sensor data; and providing the representation as input to a machine learning model configured to output a set of objects relevant to determining a predicted trajectory for the first agent.

K. The method of paragraph J, wherein the machine learning model is configured to output: a first set of objects relevant to determining a first portion of the predicted trajectory for the first agent, corresponding to the first time associated with the representation; and a second set of objects relevant to determining a second portion of the predicted trajectory for the first agent, corresponding to a second time after the first time, wherein the second set of objects is different from the first set of objects.

L. The method of paragraph F, wherein the data structure is associated with the first time in the environment, and wherein determining the predicted trajectory for the first agent comprises: determining, based at least in part on the data structure, a first predicted movement of the first agent associated with the first time; determining, based at least in part on the first predicted movement of the first agent, a predicted representation of the environment at a second time after the first time; determining, based at least in part on the predicted representation of the environment at the second time, a second subset of objects relevant to a future state of the first agent at the second time, the second subset including the first object and the second object; determining a third object interaction vector between the first agent and the first object at the second time; determining a fourth object interaction vector between the first agent and the second object at the second time; encoding the third object interaction vector and the fourth object interaction vector into a second data structure; and determining, based at least in part on the second data structure, a second predicted movement of the first agent associated with the second time.

M. The method of paragraph F, wherein determining the first subset of objects comprises: determining, based at least in part on the sensor data, a first attribute of the environment at the first time; and determining the maximum number of objects, based at least in part on the first attribute of the environment.

N. The method of paragraph F, wherein the first subset of objects associated with the first agent includes: a second agent in the environment; and a static object in the environment.

O. One or more non transitory computer readable media storing instructions executable by a processor, wherein the instructions, when executed, cause the processor to perform operations comprising: receiving sensor data associated with an environment at a first time, the environment including a first agent and a plurality of additional objects; determining, from the plurality of additional objects, a first subset of objects associated with the first agent relevant to a future state of the first agent, the first subset including a first object and a second object, wherein the first subset is limited to a maximum number of objects; determining a first object interaction vector between the first agent and the first object; determining a second object interaction vector between the first agent and the second object; encoding the first object interaction vector and the second object interaction vector into a data structure wherein, in the data structure, the first object interaction vector and the second object interaction vector are associated with the first agent, and wherein a number of object interaction vectors for the first agent is limited to the maximum number of objects; and determining, based at least in part on the data structure, a predicted trajectory for the first agent within the environment.

P. The one or more non transitory computer readable media of paragraph O, the operations further comprising: determining, from the plurality of additional objects, a second subset of objects relevant to a future state of a second agent in the environment, the second subset including the first object and a third object, wherein the second subset of objects is different from the first subset of objects, and wherein the second subset is limited to the maximum number of objects; determining a third object interaction vector between the second agent and the first object; determining a fourth object interaction vector between the second agent and the third object; encoding the third object interaction vector and the fourth object interaction vector into a second data structure; and determining, based at least in part on the second data structure, a second predicted trajectory for the second agent within the environment.

Q. The one or more non transitory computer readable media of paragraph O, wherein determining the first subset of objects comprises applying a heuristic to the plurality of additional objects, wherein the heuristic is based at least in part on at least one of: an object position relative to a position of the first agent; an object orientation relative to an orientation of the first agent; an object velocity relative to a velocity of the first agent; or an attribute of the environment.

R. The one or more non transitory computer readable media of paragraph O, wherein determining the first subset of objects comprises: determining a representation of the environment at the first time, based at least in part on the sensor data; and providing the representation as input to a machine learning model configured to output a set of objects relevant to determining a predicted trajectory for the first agent.

S. The one or more non transitory computer readable media of paragraph R, wherein the machine learning model is configured to output: a first set of objects relevant to determining a first portion of the predicted trajectory for the first agent, corresponding to the first time associated with the representation; and a second set of objects relevant to determining a second portion of the predicted trajectory for the first agent, corresponding to a second time after the first time, wherein the second set of objects is different from the first set of objects.

T. The one or more non transitory computer readable media of paragraph O, wherein the data structure is associated with the first time in the environment, and wherein determining the predicted trajectory for the first agent comprises: determining, based at least in part on the data structure, a first predicted movement of the first agent associated with the first time; determining, based at least in part on the first predicted movement of the first agent, a predicted representation of the environment at a second time after the first time; determining, based at least in part on the predicted representation of the environment at the second time, a second subset of objects relevant to a future state of the first agent at the second time, the second subset including the first object and the second object; determining a third object interaction vector between the first agent and the first object at the second time; determining a fourth object interaction vector between the first agent and the second object at the second time; encoding the third object interaction vector and the fourth object interaction vector into a second data structure; and determining, based at least in part on the second data structure, a second predicted movement of the first agent associated with the second time.

While the example clauses described above are described with respect to particular implementations, it should be understood that, in the context of this document, the content of the example clauses can be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:
1. A system comprising:
one or more processors; and
one or more non-transitory computer-readable media storing computer-executable instructions that, when executed, cause the one or more processors to perform operations comprising:
receiving sensor data of an environment captured by a sensor of an autonomous vehicle, wherein the environment includes a first agent and a plurality of additional objects;

determining a maximum object subset size based at least in part on a dimension of a fixed-size data structure;
determining, from the plurality of additional objects, a first subset of objects of the maximum object subset size, wherein the first subset of objects is relevant to a future state of the first agent, the first subset of objects including a first object and a second object;
determining a first feature vector associated with the first agent at a first time in the environment;
determining a second vector of relative state data associated with the first agent at the first time, based at least in part on first state data associated with the first object and second state data associated with the first object;
determining an object interaction vector of the maximum object subset size and associated with the first agent, based at least in part on a dot product of:
the first feature vector; and
the second vector of relative state data,
wherein the object interaction vector includes a first attention score associated with the first object and a second attention score associated with the second object;
encoding the object interaction vector into the fixed-size data structure, wherein a number of attention scores in the object interaction vector is limited to the maximum object subset size;
determining, based at least in part on using a fixed-cost attention mechanism to perform a tensor operation on the fixed-size data structure, a predicted trajectory for the first agent within the environment; and
controlling the autonomous vehicle based at least in part on the predicted trajectory for the first agent.

2. The system of claim 1, the operations further comprising:
determining, from the plurality of additional objects, a second subset of objects associated with a second agent in the environment, wherein the second subset of objects is different from the first subset of objects;
determining a second object interaction vector of the maximum object subset size and associated with the second agent, based at least in part on:
a third feature vector associated with the second agent at the first time in the environment; and
a fourth vector of relative state data associated with the second agent at the first time; and
determining, based at least in part on the second object interaction vector, a second predicted trajectory for the second agent within the environment, wherein controlling the autonomous vehicle based at least in part on the second predicted trajectory for the second agent.

3. The system of claim 1, wherein determining the first subset of objects associated with the first agent comprises applying a heuristic to the plurality of additional objects, wherein the heuristic is based at least in part on at least one of:
an object position relative to a position of the first agent;
an object orientation relative to an orientation of the first agent;
an object velocity relative to a velocity of the first agent; or
an attribute of the environment.

4. The system of claim 1, wherein determining the first subset of objects associated with the first agent comprises:
determining a representation of the environment at the first time, based at least in part on the sensor data; and
providing the representation as input to a machine learning model configured to output a set of objects relevant to determining a predicted trajectory for the first agent.

5. A method comprising:
receiving sensor data associated with an environment at a first time, the environment including a first agent and a plurality of additional objects;
determining a maximum object subset size based at least in part on a dimension of a fixed-size data structure;
determining, from the plurality of additional objects, a first subset of objects of the maximum object subset size, wherein the first subset of objects is relevant to a future state of the first agent, the first subset of objects including a first object and a second object;
determining a first object interaction vector associated with the first agent, the first object interaction vector comprising:
a first interaction feature associated with the first agent and the first object; and
a second interaction feature associated with the first agent and the second object;
encoding the first object interaction vector into the fixed-size data structure wherein a number of interaction features in the first object interaction vector is limited to the maximum object subset size;
determining, based at least in part on using an attention mechanism to perform a tensor operation on the fixed-size data structure, a predicted trajectory for the first agent within the environment; and
controlling an autonomous vehicle based at least in part on the predicted trajectory for the first agent.

6. The method of claim 5, further comprising:
determining, from the plurality of additional objects, a second subset of objects of the maximum object subset size, wherein the second subset of objects is relevant to a future state of a second agent in the environment, the second subset of objects including the first object and a third object, wherein the second subset of objects is different from the first subset of objects;
determining a second object interaction vector associated with the second agent, the second object interaction vector comprising:
a third interaction feature associated with the second agent and the first object; and
a fourth interaction feature associated with the second agent and the third object;
encoding the second object interaction vector into a second fixed-size data structure of a same size as the fixed-size data structure; and
determining, based at least in part on the second fixed-size data structure, a second predicted trajectory for the second agent within the environment.

7. The method of claim 6, wherein:
the second agent is included in the first subset of objects; and
the first agent is not included in the second subset of objects.

8. The method of claim 5, wherein determining the first subset of objects comprises applying a heuristic to the plurality of additional objects, wherein the heuristic is based at least in part on at least one of:
an object position relative to a position of the first agent;
an object orientation relative to an orientation of the first agent;
an object velocity relative to a velocity of the first agent; or
an attribute of the environment.

9. The method of claim 5, wherein determining the first subset of objects comprises:
determining a representation of the environment at the first time, based at least in part on the sensor data; and
providing the representation as input to a machine learning model configured to output a set of objects relevant to determining the predicted trajectory for the first agent.

10. The method of claim 9, wherein the machine learning model is configured to output:
a first set of objects relevant to determining a first portion of the predicted trajectory for the first agent, corresponding to the first time associated with the representation; and
a second set of objects relevant to determining a second portion of the predicted trajectory for the first agent, corresponding to a second time after the first time, wherein the second set of objects is different from the first set of objects.

11. The method of claim 5, wherein determining the first subset of objects comprises:
determining, based at least in part on the sensor data, a first attribute of the environment at the first time; and
determining the maximum object subset size, based at least in part on the first attribute of the environment.

12. The method of claim 5, wherein the first subset of objects associated with the first agent includes:
a second agent in the environment; and
a static object in the environment.

13. The method of claim 5, further comprising:
determining the first interaction feature based at least in part on a first attention score for the first agent associated with the first object; and
determining the second interaction feature based at least in part on a second attention score for the first agent associated with the second object.

14. The method of claim 5, further comprising:
determining the maximum object subset size based at least in part on at least one of a driving environment attribute associated with the environment, a scene complexity associated with the environment, and a velocity of the first agent.

15. One or more non-transitory computer-readable media storing instructions executable by a processor, wherein the instructions, when executed, cause the processor to perform operations comprising:
receiving sensor data associated with an environment at a first time, the environment including a first agent and a plurality of additional objects;
determining a maximum object subset size based at least in part on a dimension of a fixed-size data structure;
determining, from the plurality of additional objects, a first subset of objects of the maximum object subset size, wherein the first subset of objects is relevant to a future state of the first agent, the first subset of objects including a first object and a second object;
determining a first object interaction vector associated with the first agent, the first object interaction vector comprising:
a first interaction feature associated with the first agent and the first object; and
a second interaction feature associated with the first agent and the second object;
encoding the first object interaction vector into the fixed-size data structure wherein a number of interaction features in the first object interaction vector is limited to the maximum object subset size;
determining, based at least in part on using an attention mechanism to perform a tensor operation on the fixed-size data structure, a predicted trajectory for the first agent within the environment; and
controlling an autonomous vehicle based at least in part on the predicted trajectory for the first agent.

16. The one or more non-transitory computer-readable media of claim 15, the operations further comprising:
determining, from the plurality of additional objects, a second subset of objects of the maximum object subset size, wherein the second subset of objects is relevant to a future state of a second agent in the environment, the second subset of objects including the first object and a third object, wherein the second subset of objects is different from the first subset of objects;
determining a second object interaction vector associated with the second agent, the second object interaction vector comprising:
a third interaction feature associated with the second agent and the first object; and
a fourth interaction feature associated with the second agent and the third object;
encoding the second object interaction vector into a second fixed-size data structure of a same size as the fixed-size data structure; and
determining, based at least in part on the second fixed-size data structure, a second predicted trajectory for the second agent within the environment.

17. The one or more non-transitory computer-readable media of claim 15, wherein determining the first subset of objects comprises applying a heuristic to the plurality of additional objects, wherein the heuristic is based at least in part on at least one of:
an object position relative to a position of the first agent;
an object orientation relative to an orientation of the first agent;
an object velocity relative to a velocity of the first agent; or
an attribute of the environment.

18. The one or more non-transitory computer-readable media of claim 15, wherein determining the first subset of objects comprises:
determining a representation of the environment at the first time, based at least in part on the sensor data; and
providing the representation as input to a machine learning model configured to output a set of objects relevant to determining the predicted trajectory for the first agent.

19. The one or more non-transitory computer-readable media of claim 18, wherein the machine learning model is configured to output:
a first set of objects relevant to determining a first portion of the predicted trajectory for the first agent, corresponding to the first time associated with the representation; and
a second set of objects relevant to determining a second portion of the predicted trajectory for the first agent, corresponding to a second time after the first time, wherein the second set of objects is different from the first set of objects.

20. The one or more non-transitory computer-readable media of claim 15, wherein the fixed-size data structure is associated with the first time in the environment, and wherein determining the predicted trajectory for the first agent comprises:

determining, based at least in part on the fixed-size data structure, a first predicted movement of the first agent associated with the first time;

determining, based at least in part on the first predicted movement of the first agent, a predicted representation of the environment at a second time after the first time;

determining, based at least in part on the predicted representation of the environment at the second time, a second subset of objects relevant to a future state of the first agent at the second time, the second subset of objects including the first object and the second object;

determining a third interaction feature associated with the first agent and the first object at the second time;

determining a fourth interaction feature associated with the first agent and the second object at the second time;

encoding the third interaction feature and the fourth interaction feature into a second fixed-size data structure of a same size as the fixed-size data structure; and determining, based at least in part on the second fixed-size data structure, a second predicted movement of the first agent associated with the second time.

\* \* \* \* \*